US008913989B2

(12) United States Patent
Best et al.

(10) Patent No.: US 8,913,989 B2
(45) Date of Patent: *Dec. 16, 2014

(54) SECURE TRANSMISSION OVER SATELLITE PHONE NETWORK

(75) Inventors: Fiona S. Best, Crofton, MD (US); Dorothy A. McClintock, Highland, MD (US); William Jeremy Lee, Crownsville, MD (US); Wesley R. Hartwell, Sykesville, MD (US); Eric Reed, Jackson, NJ (US)

(73) Assignee: TeleCommunication Systems, Inc., Annapolis, MD (US)

( * ) Notice: Subject to any disclaimer, the term of this patent is extended or adjusted under 35 U.S.C. 154(b) by 157 days.

This patent is subject to a terminal disclaimer.

(21) Appl. No.: 12/929,728

(22) Filed: Feb. 11, 2011

(65) Prior Publication Data

US 2011/0237247 A1 Sep. 29, 2011

Related U.S. Application Data

(63) Continuation of application No. 12/656,162, filed on Jan. 20, 2010, now Pat. No. 7,890,051, which is a
(Continued)

(51) Int. Cl.
*H04M 1/66* (2006.01)
(Continued)

(52) U.S. Cl.
CPC ........... *H04B 7/18565* (2013.01); *H04W 12/04* (2013.01); *H04M 2250/06* (2013.01); *H04M 1/72502* (2013.01); *H04L 63/061* (2013.01); *H04K 1/00* (2013.01); *H04L 63/30* (2013.01); *H04L 9/3013* (2013.01); *H04L 63/0485* (2013.01); *H04M 1/2535* (2013.01); *H04W 12/02* (2013.01); *H04L 9/00* (2013.01)

USPC ........... 455/410; 455/411; 455/12.1; 455/500

(58) Field of Classification Search
CPC ...................... H04L 29/12292; H04L 61/2069
USPC .................................................. 455/410, 411
See application file for complete search history.

(56) References Cited

U.S. PATENT DOCUMENTS 4,223,185 A 9/1980 Picou
4,445,118 A 4/1984 Taylor
(Continued)

OTHER PUBLICATIONS

Daniel et al., The Future Narrowband and Digital Terminal, School of Electrical and Computer Engineering, pp. 589-592, Dec. 6, 2008.
(Continued)

*Primary Examiner* — Tilahun B Gesesse
(74) *Attorney, Agent, or Firm* — William H. Bollman

(57) ABSTRACT

A reach back secure communications terminal includes a modem to satellite interconnect board that captures DTMF tones, demodulates encrypted modem information, and converts both into an ASCII string for presentation to a data port of a satellite phone, allowing out-of-band control of a non-secure satellite system (e.g., AT command control of a data port) by a user on a secure side of an encryption device, by including the ability to interpret control signals and control the satellite system appropriately. A false dial tone is presented to the encryption device, and the data stream coming from the encryption device is monitored for the presence of dual-tone, multi-frequency (DTMF) tones representing control signals, the DTMF tones are converted to ASCII characters, which are in turn received as control signals by the satellite phone, allowing control of the functions of the satellite system directly from the secure side of the encryption device.

12 Claims, 31 Drawing Sheets

Related U.S. Application Data continuation of application No. 11/135,397, filed on May 24, 2005, now Pat. No. 7,761,095, which is a continuation of application No. 11/008,596, filed on Dec. 10, 2004, now Pat. No. 8,239,669.

(60) Provisional application No. 60/553,547, filed on Mar. 17, 2004.

(51) Int. Cl.

| | |
|---|---|
| H04M 3/16 | (2006.01) |
| H04M 1/00 | (2006.01) |
| H04W 12/04 | (2009.01) |
| H04M 1/725 | (2006.01) |
| H04L 29/06 | (2006.01) |
| H04K 1/00 | (2006.01) |
| H04L 9/30 | (2006.01) |
| H04B 7/185 | (2006.01) |
| H04M 1/253 | (2006.01) |
| H04W 12/02 | (2009.01) |
| H04L 9/00 | (2006.01) |

(56) References Cited

U.S. PATENT DOCUMENTS

| | | | | |
|---|---|---|---|---|
| 4,850,018 | A | | 7/1989 | Vogt |
| 4,866,759 | A | * | 9/1989 | Riskin ................. 379/93.27 |
| 4,928,107 | A | | 5/1990 | Kuruda |
| 5,252,985 | A | | 10/1993 | Christinsin |
| 5,280,625 | A | * | 1/1994 | Howarter et al. ............ 709/218 |
| 5,305,384 | A | | 4/1994 | Ashby |
| 5,521,607 | A | | 5/1996 | Deasy |
| 5,530,724 | A | | 6/1996 | Abrams |
| 5,689,568 | A | | 11/1997 | Laborde |
| 5,764,195 | A | | 6/1998 | Colclough |
| 5,793,498 | A | | 8/1998 | Scholl |
| 5,842,125 | A | | 11/1998 | Modzelesky |
| 5,850,602 | A | | 12/1998 | Tisdale |
| 6,023,762 | A | | 2/2000 | Dean |
| 6,070,245 | A | | 5/2000 | Murphy |
| 6,081,229 | A | | 6/2000 | Soliman |
| 6,101,180 | A | * | 8/2000 | Donahue et al. ............. 370/352 |
| 6,105,006 | A | * | 8/2000 | Davis et al. ................... 705/35 |
| 6,130,651 | A | | 10/2000 | Yanagisawa |
| 6,262,982 | B1 | * | 7/2001 | Donahue et al. ............. 370/352 |
| 6,266,339 | B1 | * | 7/2001 | Donahue et al. ............. 370/432 |
| 6,310,578 | B1 | | 10/2001 | Ying |
| 6,313,786 | B1 | | 11/2001 | Sheynblat |
| 6,317,835 | B1 | | 11/2001 | Bilger |
| 6,346,919 | B1 | | 2/2002 | Wang |
| 6,414,638 | B1 | | 7/2002 | Egashira |
| 6,424,648 | B1 | | 7/2002 | Ng |
| 6,430,504 | B1 | | 8/2002 | Gilbert |
| 6,525,687 | B2 | | 2/2003 | Roy |
| 6,525,688 | B2 | | 2/2003 | Chou |
| 6,529,731 | B2 | | 3/2003 | Modzelesky |
| 6,581,825 | B1 | * | 6/2003 | Rickerson, Jr. ............... 235/379 |
| 6,694,134 | B1 | | 2/2004 | Lu |
| 6,798,294 | B2 | | 9/2004 | Kuiri |
| 6,922,172 | B2 | | 7/2005 | Oshiyama |
| 6,978,165 | B2 | | 12/2005 | Martinez |
| 6,985,722 | B1 | | 1/2006 | Snelgrove |
| 7,027,580 | B2 | * | 4/2006 | Gamble ................. 379/218.01 |
| 7,130,424 | B2 | | 10/2006 | Marshall |
| 7,283,543 | B1 | | 10/2007 | Thompson |
| RE41,218 | E | * | 4/2010 | Fielding et al. ............. 370/319 |
| 2002/0054630 | A1 | | 5/2002 | Hoefer |
| 2002/0070881 | A1 | * | 6/2002 | Marcarelli et al. ........... 340/988 |
| 2002/0077809 | A1 | | 6/2002 | Walles |
| 2003/0009659 | A1 | | 1/2003 | DiSanto |
| 2003/0092381 | A1 | | 5/2003 | Buel |
| 2004/0004976 | A1 | | 1/2004 | Zhang |
| 2004/0123095 | A1 | | 6/2004 | Marshall |
| 2004/0160948 | A1 | | 8/2004 | Ozu |
| 2004/0161086 | A1 | | 8/2004 | Buntin |
| 2004/0204007 | A1 | | 10/2004 | Ho |
| 2005/0047570 | A1 | | 3/2005 | Schmid |
| 2006/0072520 | A1 | | 4/2006 | Chitrapu |

OTHER PUBLICATIONS

Tomi Engdahl, 2001, Telephone Line Audio Interface Circuits, EPanoram.net.

\* cited by examiner

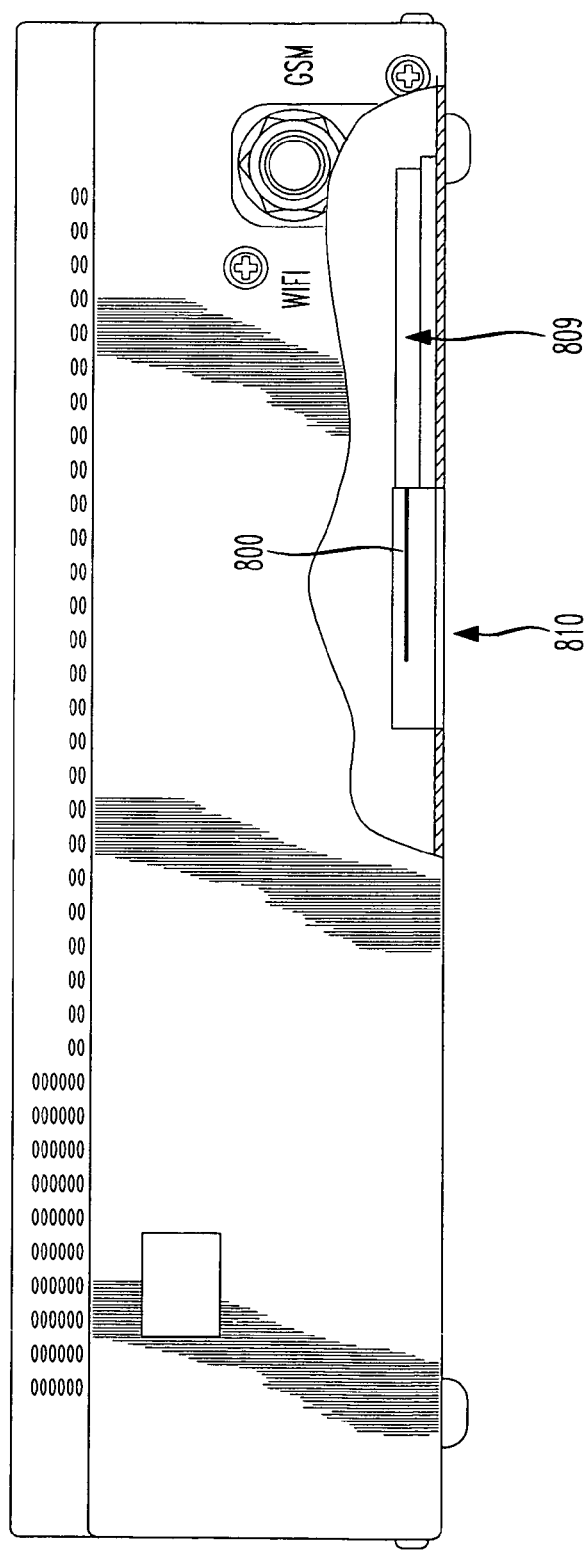
FIG. 2D(1)

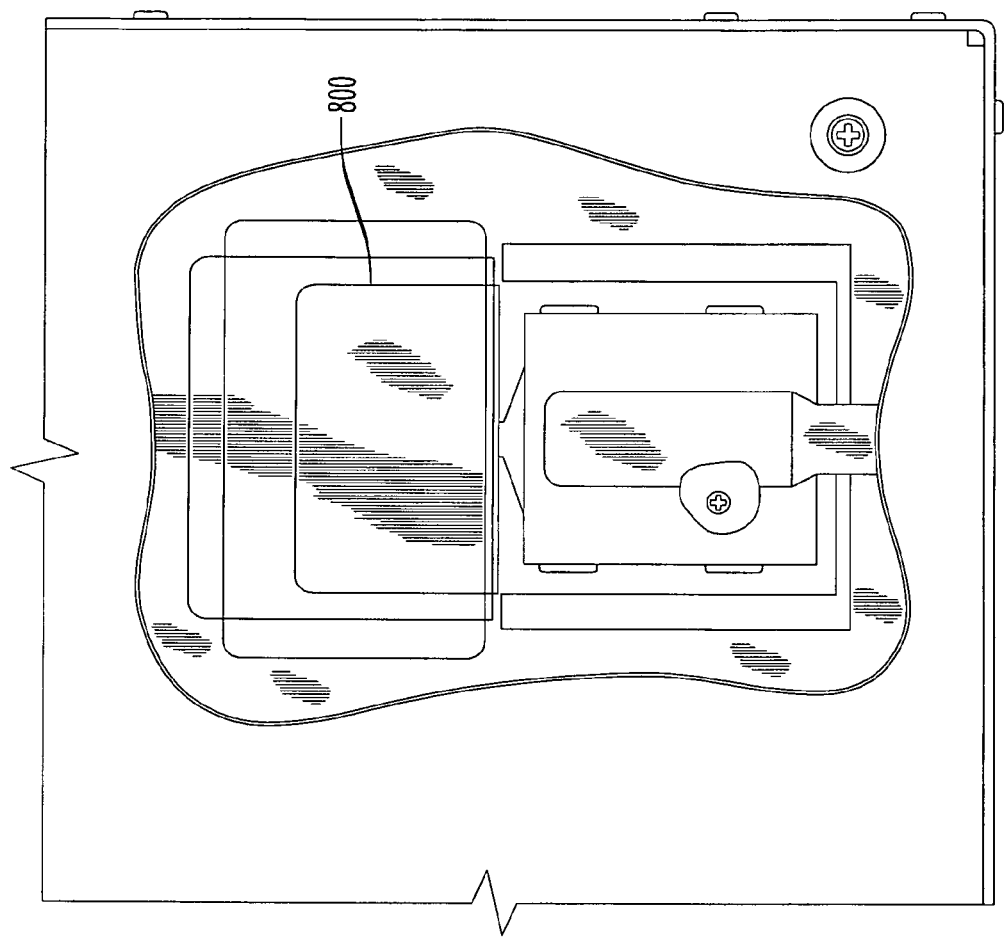
FIG. 2D(2)

FIG. 20

DATA RATES

| ENCRYPTOR | PSTN | PBX | GSM | IP | WIFI | SAT |
|---|---|---|---|---|---|---|
| OMNIxi TYPE 1 (V2.5) | 1 33.6 Kbps | 1 33.6 Kbps | 1 9.6 Kbps | 1 24 Kbps | 1 33.6 Kbps | 1 2.4 Kbps 5 |
| SECTERA WIRELINE TYPE-1 | 1 33.6 Kbps | 1 33.6 Kbps | 1 9.6 Kbps | 1 24 Kbps | 1 33.6 Kbps | 1 2.4 Kbps 5 |
| SECTERA WIRELINE TALKSECURE | 1 33.6 Kbps | 1 33.6 Kbps | 1 9.6 Kbps | 1 24 Kbps | 1 33.6 Kbps | 1 2.4 Kbps 5 |
| COPYTELE 1200 | 2 2.4 Kbps | 2 2.4 Kbps | 2 2.4 Kbps | 2 24 Kbps | 2 2.4 Kbps | 2 2.4 Kbps 5 |

MAXIMUM DATA RATE CONSTRAINTS:
1. MAXIMUM RATE CONSTRAINED BY THE ENCRYPTOR USE OF THE V.34 MODEM FOR ASYNCHRONOUS DATA
2. MAXIMUM RATE CONSTRAINED BY THE ENCRYPTOR MODEM
3. MAXIMUM RATE CONSTRAINED BY GSM CIRCUIT SWITCHED DATA NETWORK USED FOR SECURE DATA
4. MAXIMUM RATE CONSTRAINED BY USE OF VOIP SERVICE FOR TRANSMITTING DATA OUT THE ENCRYPTOR PSTN PORT
5. MAXIMUM RATE CONSTRAINED BY INDIUM SATELLITE NETWORK

SECURE TRANSMISSION OVER SATELLITE PHONE NETWORK

The present application is a continuation of U.S. application Ser. No. 12/656,162, entitled "Secure Transmission Over Satellite Phone Network," filed on Jan. 20, 2010, now U.S. Pat. No. 7,890,051, which is a continuation of U.S. application Ser. No. 11/135,397, entitled "Secure Transmission Over Satellite Phone Network", filed on May 24, 2005, now U.S. Pat. No. 7,761,095, which in turn is a continuation of U.S. application Ser. No. 11/008,596, entitled "Reach-Back Communications Terminal With Selectable Networking Options", filed Dec. 10, 2004 now U.S. Pat. No. 8,239,669; which in turn claims priority from U.S. Provisional Application No. 60/553,547, entitled "Portable Remote Access Reach-Back Communications Terminal", filed Mar. 17, 2004.

BACKGROUND OF THE INVENTION

1. Field of the Invention

This invention relates generally to computer and communication networks. More specifically, it relates to a portable reach-back communications system that provides extremely flexible secure or non-secure voice, video and data services to a remote user.

2. Background of the Related Art

In 1970, the Secure Telephone Unit (STU-I) was developed, followed in 1975 by the STU-II, and finally in 1987 by the third generation STU-III.

The STU-III terminals are designed to operate as either an ordinary telephone or a secure instrument over a dial-up public switched telephone network (PSTN). The STU-III operates in full-duplex over a single telephone circuit using echo canceling modem technology. Typically, STU-IIIs come equipped with 2.4 and 4.8 kbps code-excited linear prediction (CELP) secure voice. Secure data can be transmitted at speeds of 2.4, 4.8 and 9.6 kbps, though data throughput between two STU-IIIs is only as great as the slowest STU-III.

A STU-III operates by taking an audio signal and digitizing it into a serial data stream, which is then mixed with a keying stream of data created by an internal ciphering algorithm. This mixed data is then passed through a COder-DECoder (CODEC) to convert it back to audio so it can be passed over the phone line. STU-IIIs also allow a serial data stream to pass through the phone and into the ciphering engine to allow its usage as an encrypted modem when not used for voice.

The keying stream is a polymorphic regenerating mathematic algorithm which takes an initialization key and mathematically morphs it into a bit stream pattern. The keying stream is created by the key generator, and is the heart of the STU-III. A portion of the keying stream is then mixed back into the original key, and the process is repeated. The result is a pseudo-random bit stream that if properly implemented is extremely difficult to decrypt. Even the most sophisticated cryptographic algorithm can be easily expressed in the form of a simple equation in Boolean algebra, with the initialization keys being used to define the initial key generator settings, and to provide morphing back to the equation.

While STU-III provides secure communications, audio quality was vastly improved with the development of purely digital Standard Telephone Equipment (STE) devices.

An STE device utilizes an ISDN digital telephone line connection. There is substantial improvement in voice quality using an STE as opposed to the STU-III used over analog telephone lines. Most STE devices are STU-III secure mode compatible with enhanced abilities including voice-recognition quality secure voice communication, and high-speed secure data transfers (up to 38.4 kbps for asynchronous or 128 kbps for synchronous data transfers). When connected to an analog telephone line, an STE unit will only support STU-III voice and data capabilities.

The STU-III and STE are quite useful in fixed use, i.e., in an office environment or perhaps carried to another location having access to analog or digital telephone line access.

FIG. 22 is a depiction of a conventional fragmented secure communications network.

In particular, as shown in FIG. 22, a network backbone 1800 allows various like devices to securely connect to each other. The network backbone 1800 includes such communication networks as ISDN TDM, ATM and IP. Devices that can connect to the network backbone 1800 include an ISDN telephone 1810, a voice-over-IP computer terminal 1820, a voice-over-IP telephone 1830, TRI-TAC & MSE devices 1840, cellular telephones 1850, communicating using various standards including CDMA, GSM, TDMA and iDEN. Other devices that can connect to the network backbone 1800 include tactical digital radios 1850, analog cellular telephones 1860, satellite communications 1870, a dial-up computer terminal 1880, and a public switched telephone network telephone 1890.

In operation, each of the devices transmitting data to the network backbone 1800 must encrypt their respective data streams. Each of the devices receiving data from the network backbone 1800 must un-encrypt their respective data streams.

A conventional vocoder for use with the network backbone 1800 is the Mixed-Excitation Linear Predictive (MELP) vocoder. THe MELP vocoder is a dual-rate low rate coder that operates at 1200 bits-per-second (bps) and 2400 bps. The MELP vocoder meets military standard MIL-STD-3005 and NATO STANAG 4591.

FNBDT (Type 1 Future NarrowBand Digital Terminal) is an acronym that corresponds to Digital Secure Voice Protocol (DSVP) transport layer and above. DSVP operates over most data and voice network configurations with a Least Common Denominator for interoperability. DSVP interoperates with many media including wireless, satellite, IP and cellular. DSVP adapts to the data rate of the connection, with modems training down. DSVP negotiates security/application features with application to point-to-point communications and multi-point communications. DSVP supports realtime, near realtime and non-realtime applications.

FIG. 23 is a depiction of a conventional combination wired and wireless communication network supporting secure communications. Secure operation requires wireless circuit switched data service and use of a data telephone number.

In particular, as shown in FIG. 23, a combination wired and wireless communication network comprises various analog and digital communication networks 1900, such as PSTN 1901, analog communication networks 1902 and digital communication networks 1903. Devices connecting to the various analog and digital communication networks 1900 include mobile satellite service devices 1910 connecting to a satellite service 1911, e.g., Iridium, Globalstar and ICO. The mobile satellite service devices 1910 communicate through a Iridium satellite system. Further devices connecting to the various analog and digital communication networks 1900 include STE 1920, digital cellular telephones 1930 using, e.g., GSM standards, digital cellular telephones 1940 connecting to a CDMA network. A tactical MSE/TRI-TAC network 1950 allows various devices to connect to the various communication networks 1900. Devices connecting to the tactical MSE/TRI-TAC network 1950 are, e.g., JTR 1952, deployable LMR 1954 and cellular tactical STE 1956. The tactical MSE/TRI-TAC network 1950 can connect to a CDMA network. A STU-III 1970 and analog cellular telephone 1972, e.g., CipherTAC 2000, connect to the analog network 1902.

In operation, CDMA communications occur at 800 Mhz over CONUS approved networks, such as Verizon and ALLTEL. GSM communications occur at 850 Mhz and 1900 Mhz over CONUS approved networks, such as T-Mobile and AT&T. OCONUS European GSM 900 MHz and 1800 MHz, many are approved based on commercial approval of TimeportII GSM phone within SECTERA-GSM secure terminal.

Any of the communication devices of FIG. 23 can obtain a secure voice connection with any secure, like communication device.

FIG. 24 is a depiction of a conventional deployable secure communication system utilizing a satellite communication network.

In particular, as shown in FIG. 24, a secure encryption STE 700 with suitable interface hardware is utilized to provide a connection path to a wireless connection to a similarly secure STE via a satellite transceiver 914, e.g., an Inmarsat M4 terminal. In the conventional system of FIG. 24, an ISDN link is utilized between the STE 700 and a suitable satellite two-way communication transceiver and antenna 914.

In operation, voice data is encrypted by the STE 700, and transmitted in a secure environment over a physically secure satellite, e.g., the M4 INMARSAT satellite transceiver 914.

It is vitally important that the STE 700 stay physically secured, to maximize protection of the information being passed thereover. Also, to further maximize protection of the information, the satellite transceiver 914 is conventionally set up and maintained within a secure environment, and usually travels with the STE 700.

Conventional systems are typically physically large, e.g., the size of a van. More importantly, such conventional systems require all elements to be maintained in a secure environment, including the data transport system (e.g., satellite communication system) over which the data travels to another secure communications terminal. Such secure data transport systems are costly to install and maintain, and always run a risk of being compromised.

FIG. 25 is a depiction of a conventional CDMA to GSM secure call setup.

In particular, before two-party secure voice traffic starts, FNBDT Call Setup Application messages are exchanged using an FNBDT Application Reliable Transport and Message Layer Protocols.

FIG. 26 is a depiction of a conventional FNBDT example call.

In particular, FNBDT secure voice & data may be sent over may network segments. The connection shown use CDMA, PSTN and GSM networks.

The prior art uses a plurality of different devices, one for connection to each network that a user desires to connect with. Thus, there is a need for a small, lightweight, easily portable and easily deployable communication system that is not only even more secure than conventional systems, but which also allows flexibility in use of non-secure data transport systems.

Such conventional secure systems are typically physically large but more importantly allow for only direct secure connection communication between a remote user and a like receiver to maintain security in the communications. While this is quite useful in many situations, only limited communications are possible in a direct connection. For instance, direct, secure connectivity does not also allow access to non-secure public communication systems, e.g., the Internet.

There is a need for a small, lightweight, and extremely flexible and adaptable communications terminal capable of quick, convenient and easy use with a multitude of network environments, and for a deployable communication system that is not only more secure than conventional systems, but which also allows flexibility in use of non-secure data transport systems.

SUMMARY OF THE INVENTION

In accordance with the principles of the present invention, an interface for use between an encryption device and a satellite phone comprises a modem interface, and a DTMF conversion to ASCII module receiving a data stream from the modem interface. The DTMF conversion is adapted to remove in-band control signaling from the data stream, and to present the control signaling out-of-band to a data port of the satellite phone.

A method of providing control signals from a user on a secure end of an encryption device to a non-secure data network in accordance with another aspect of the present invention, comprises monitoring an in-band data stream for presence of a DTMF tone. The DTMF tone received in-band from said encryption device is decoded. The DTMF tones are decoded into ASCII control information. The ASCII control information is presented out-of-band to the non-secure data network.

BRIEF DESCRIPTION OF THE DRAWINGS

FIG. 2D(1) shows a rear cut-away view of the reach-back communications terminal, in accordance with the principles of the present invention.

FIG. 2D(2) shows a base cut-away view of the reach-back communications terminal, in accordance with the principles of the present invention.

FIG. 20 shows the potential data rates for the different types of communication networks available with use on the reach-back communication terminal, in accordance with the principles of the present invention.

DETAILED DESCRIPTION OF ILLUSTRATIVE EMBODIMENTS

Figure 1:
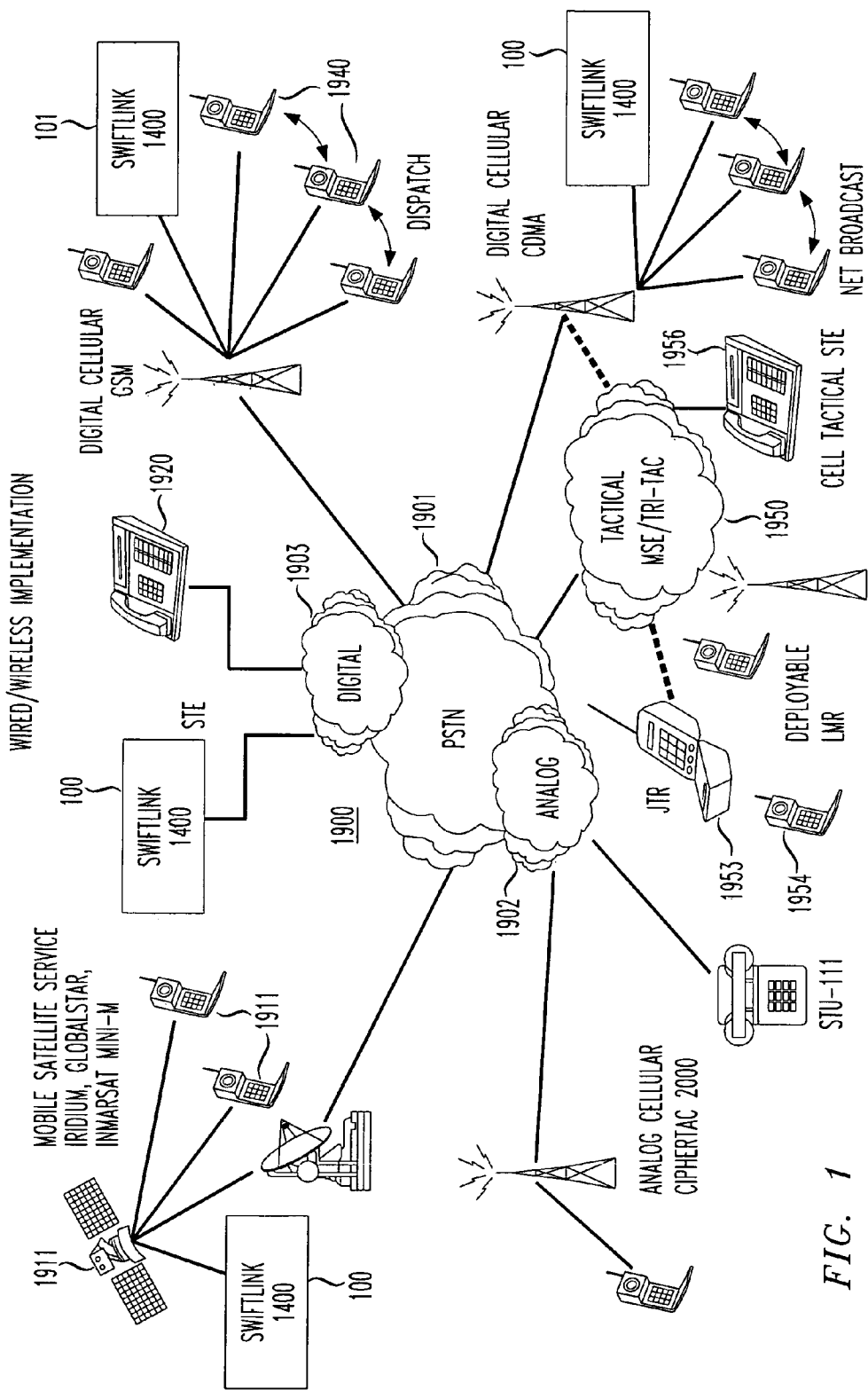
FIG. 1 shows a combination wired and wireless communication network supporting secure communications including a reach-back communications network, in accordance with the principles of the present invention.

The communications terminal disclosed herein is an extremely portable and fully capable remote access communications terminal ideal for reach-back secure communications over any of many network options, and other uses. Extending the reach of a headquarters' voice, data and video network services, a reach-back communications terminal as disclosed herein offers key benefits. For instance, high availability and reliable connectivity are provided, as are total access to vital resources, and secure extension to the home office. Moreover, a reach-back communications terminal as disclosed herein allows a user to select a lowest cost network routing option from among multiple possible network options.

The disclosed reach-back communications terminal is a remote communications terminal that enables highly available connections back to a headquarters network, delivering dependable access to mission-critical personnel and information. Integrated components simplify access to varied networks allowing deployed users to select and connect quickly to a network that best supports their present mission.

The disclosed reach-back communications terminal provides immediate and secure access. For example, first responders require secure, readily-available voice, data and video communications. The reach-back communications terminal disclosed herein enables fast and secure connectivity to multiple telecommunications networks. Security is guaranteed with Type 4 encryption or optional NSA Type 1 encryption. As part of a system solution, reach-back communications terminal home stations provide end-to-end reach-back networking to infrastructure and services. For US government users, the reach-back communications terminal enables remote connections to secure networks, e.g., to SIPRNET or NIPRNET.

Type 1 encryption may include L-3 OMNIxi, General Dynamics Sectera (Omega) and Sectera Wireline. Type 4 encryption includes General Dynamics TalkSecure (AES). The reach-back communications terminal preferably also implements Type 1 Future NarrowBand Digital Terminal (FNBDT) signaling and cryptography specifications as defined by the U.S. Government. Non-Type 1 cryptography includes standard P224 Elliptic Curve Cryptography (ECC) identified in FIPS 186-2.

The reach-back communications terminal implements Type 1 cryptography by implementing Type 1 FNBDT signaling and cryptography specifications as defined by the U.S. Government.

The reach-back communications terminal implements non-Type 1 cryptography using standard P-224 Elliptic Curve Cryptography (ECC), identified FIPS 186-2, to derive a pair-wise, unique session key. ECC provides a higher security strength than RSA for a given key length and increases as the key length grows. For example, a 160-bit ECC key is equivalently secure to a 1024-bit RSA key, a 224-bit ECC key is more secure than a 2048-bit RSA key, and a 320-bit ECC key is equivalently secure to a 5120-bit RSA key.

During secure call setup, the reach-back communications terminal exchanges public keys with the remote terminal using FNBDT signaling. Traffic encryption is performed using the NIST approved Advanced Encryption System (AES) standard (Rijndael) and a 128-bit random key (2^128 possible keys).

The disclosed reach-back communications terminal is housed in an easily portable and lightweight casing, e.g., weighing less than 15 pounds in the disclosed embodiments. Easy terminal set up takes three minutes or less, and users plug in their own, familiar laptop for direct system access. For ease of portability, the reach-back communications terminal 100 may be associated with a carrying case, e.g., computer-style and ruggedized.

FIG. 1 is a depiction of a combination wired and wireless communication network supporting secure communications including a reach-back communications network 100, in accordance with the principles of the present invention.

In particular, as shown in FIG. 1, a combination wired and wireless communication network comprises various analog and digital communication networks 1900, such as PSTN 1901, analog communication network 1902 and digital network 1903. Devices connecting to the various digital communication networks 1900 include mobile satellite service devices 1910 connecting to a satellite service 1911, e.g., Iridium, Globalstar and INMARSAT Mini-M. Further devices connecting to the various digital communication networks 1900 include an encryptor 1920 (e.g., an FNBDT encryptor), digital cellular telephones 1930 using, e.g., GSM communication standards and digital cellular telephones 1940 connecting to a CDMA network.

In accordance with the principles of the present invention, the disclosed reach-back communication terminals 100 are able to obtain a secure connection with any of the other communication devices of FIG. 1, including with each other, thus providing a flexible cross-network secure communications channel between like or differing user devices. Exemplary network communication paths include a satellite service 1911, a GSM cellular network, and a CDMA cellular network.

Figure 2A:
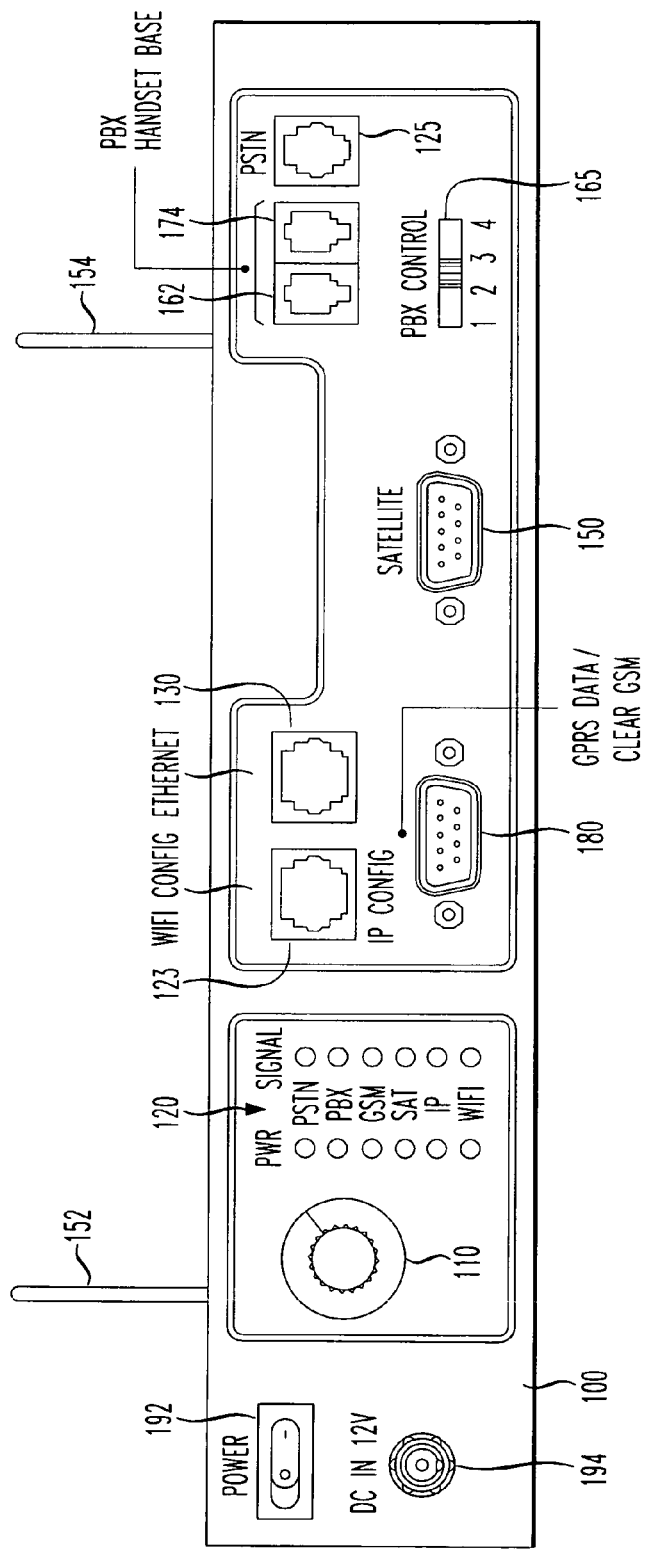
FIG. 2A shows a front panel view of the reach-back communications terminal, in accordance with the principles of the present invention.

FIG. 2A shows a front panel view of an exemplary reach-back communications terminal 100, in accordance with the principles of the present invention.

In particular, as shown in FIG. 2A, the reach-back communications terminal 100 is comprised of a network selector switch 110, status indicator lights 120, an IP Config port 123, a PSTN port 125, an Ethernet/WiFi Config port 130, a secure data OUT port to a satellite transceiver port (SDOS) 150, a PBX handset port 162, a PBX Control switch 165, a PBX base port 174, an unsecured GSM/GPRS data port 180, a power button 192, and a DC power-in connector 194.

Two antenna, antenna 152 and antenna 154, although preferably connected to the back of the reach-back communications terminal 100 are viewable from the front panel view of the reach-back communications terminal 100. Antenna 152 and antenna 154 allow transmission to and reception from a cellular telephone network, e.g., a GSM network, and a wireless fidelity (WiFi) network, respectively.

Figure 4:
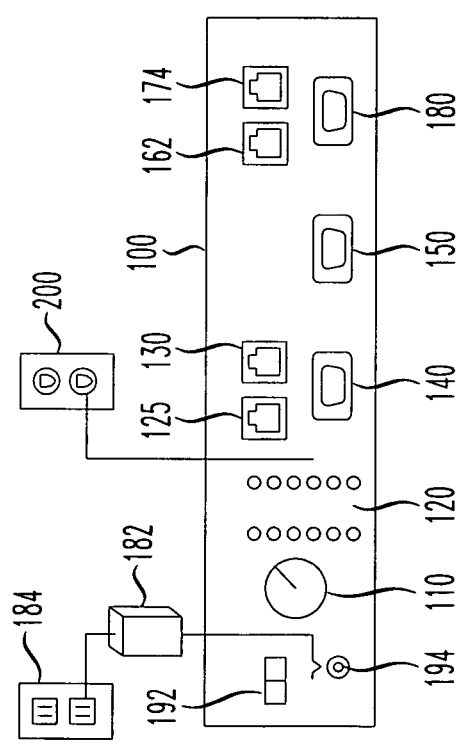
FIG. 4 shows the reach-back communications terminal set up to establish voice communications through a PSTN network, in accordance with the principles of the present invention.

The power button 192 is used to activate internal circuitry within the reach-back communications terminal 100. The AC/DC power supply 182, shown in FIG. 4, is connectable to an AC power source 184, e.g., a conventional wall outlet, in the exemplary embodiments. Power provided by the AC power source 184 (e.g., 110/220V, 50/60 Hz) is converted to 12V DC by the AC/DC power supply 182 for connection to the DC power-in connector 194.

Alternately, a DC power source (e.g., a 12V battery pack) can be used as a power source. The DC power source, not shown, is preferably external to the housing of the reach-back communications terminal 100 to facilitate streamlined autonomy from external power sources, though an internal DC power source is within the principles of the invention. Preferably, universal power inputs/battery packs are utilized to allow for un-tethered operations and ease of replacing components.

Network selector switch 110 allows a user of the reach-back communications terminal 100 the flexibility to choose one of a plurality of data communications networks and voice communications networks. Data communications and voice can occur over any available network, e.g., Public Switched Telephone Network (PSTN), Private Branch Exchange (PBX), Global System for Mobile communications (GSM), satellite (SAT), Internet Protocol (IP) or WiFi.

The status indicator lights 120 allow an operator of the reach-back communications terminal 100 a visual verification of selection of the desired data communications circuitry and voice communications circuitry within the reach-back communications terminal 100, and a visual indication of an available signal on the selected data communications network and voice communications network.

IP Config port 123 is a non-secure connection point for a personal computer to connect to and configure the reach-back communications terminal 100 with a static IP address. For example, in instances where a dynamic address is unobtainable from a network connection, a static address will be assigned to the reach-back communications terminal 100 by an application executed on a personal computer connected to the IP Config port 123.

Ethernet/WiFi Config port 130 serves a dual purpose. Ethernet/WiFi Config port 130 is a non-secure connection point for a personal computer to connect to the reach-back communications terminal 100 to configure a WiFi connection. Alternately, a menu option on the personality faceplate 145 can be used to configure the reach-back communications terminal 100 for connection to a WiFi network. Ethernet/WiFi Config port 130 is used to connect the reach-back communications terminal 100 to a wired LAN.

The unsecured GSM/GPRS data port 180 allows users of the reach-back communications terminal 100 unencrypted access to a GSM/GPRS network if desired. Any device with the proper connector, such as a PDA or personal computer can be connected to the unsecured GSM/GPRS data port 180 to allow that device unsecured access to a GSM network and a GPRS network.

SDOS port 150 allows users of the reach-back communications terminal 100 a secure connection to a compatible satellite device. Any devices with a compatible connector, such as a satellite telephone and an Inmarsat M4 terminal, can be connected to the SDOS port 150 to allow the reach-back communications terminal 100 access to a satellite network.

PSTN port 125 allow the reach-back communications terminal 100 to be connected to a PSTN network.

Figure 6:
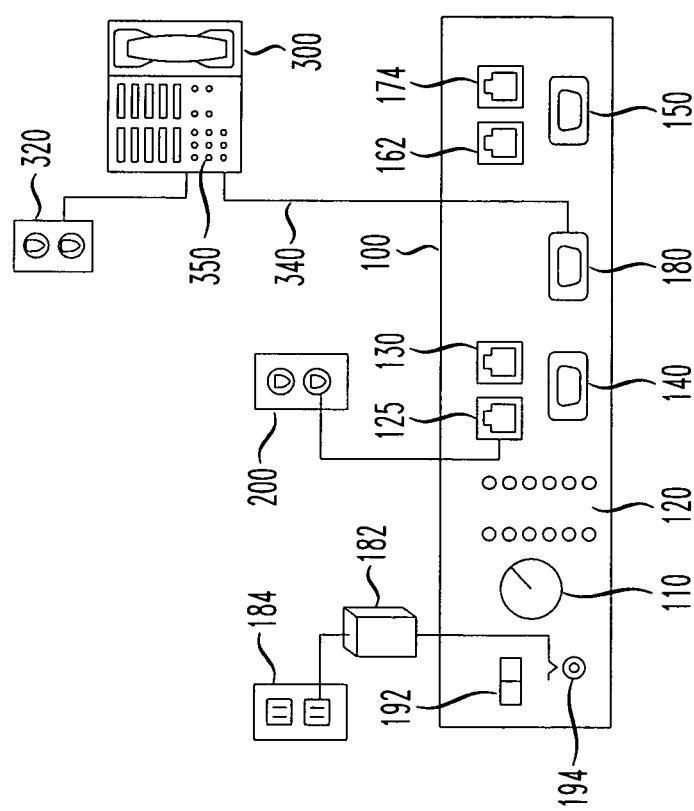
FIG. 6 shows the reach-back communications terminal set up to establish voice communications through a PBX network, in accordance with the principles of the present invention.

PBX handset port 162 and PBX base port 174 allow respectively a handset from a conventional telephone and a handset port from a conventional telephone to be connected to the reach-back communications terminal, as shown in FIG. 6.

The PBX control switch 165 is used to switch internal circuitry within the reach-back communications terminal 100 between different modes corresponding to different types of PBX systems. The inventors have determined that there are essentially four predominant, different PBX types commonly found currently in use. Of course, other types of PBX systems may be implemented, perhaps requiring a switch 165 having additional positions, within the scope of the present invention.

For example, after a user connects the reach-back communications terminal 100 to a PBX wall plate 320, shown in FIG.

Figure 2B:
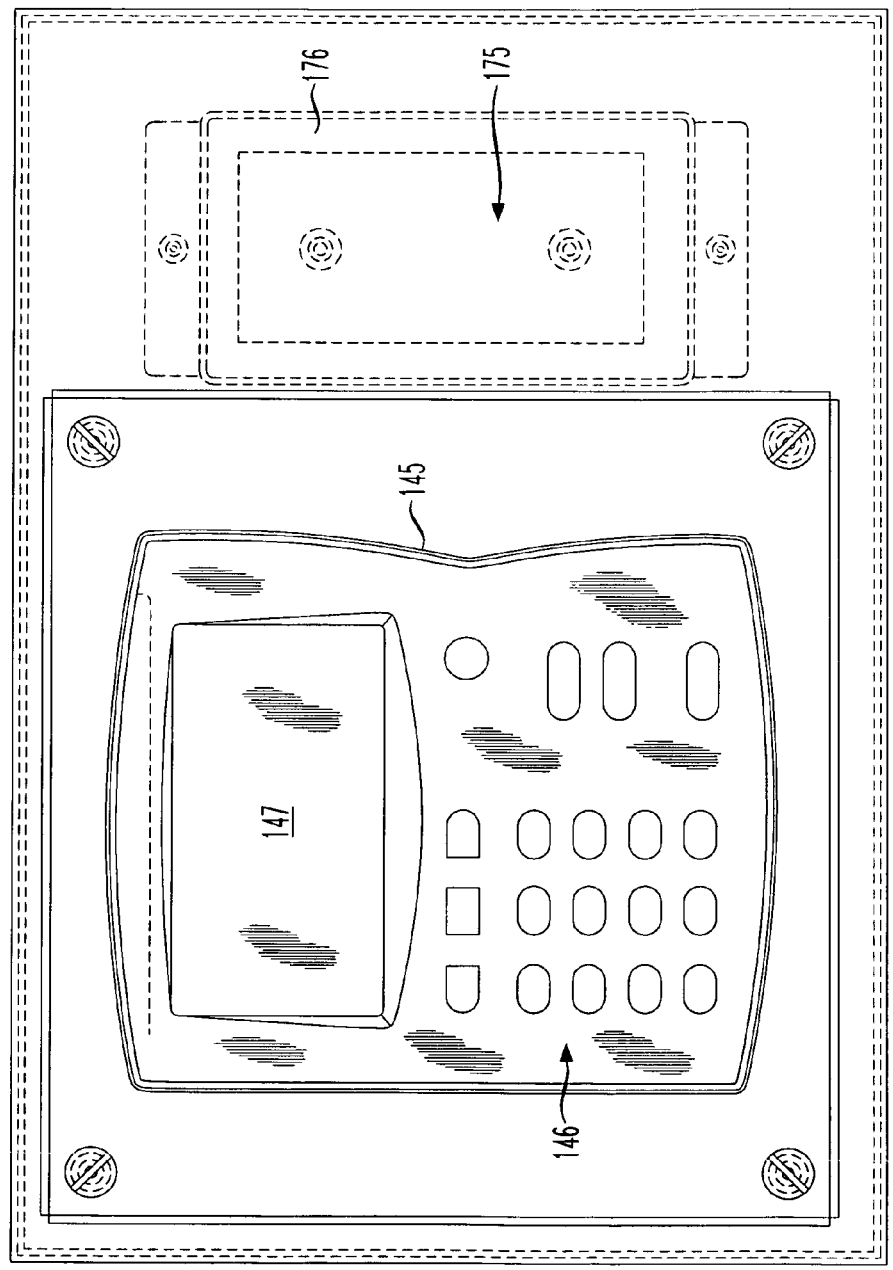
FIG. 2B shows a top panel view of the reach-back communications terminal, in accordance with the principles of the present invention.

6, the integrated telephone handset 176, shown in FIG. 2B, may be picked up to listen for a dial tone. If no dial tone is audible, the PBX control switch 165 may be moved to another designated position until an audible dial tone is available. An audible dial tone indicates that the PBX control switch 165 is at a position of compatibility for a particular PBX network that the reach-back communications terminal 100 is currently connected to.

Likewise, network selector switch 110 is rotatable through six positions PSTN, PBX, GSM, SAT, IP and WIFI. The six positions, i.e., PSTN, PBX, GSM, SAT, IP and WIFI, correspond respectively to: PSTN communications using PSTN port 125; PBX communications using PBX base port 174; GSM communications using GSM antenna 152; SAT communications using SDOS 150; IP communications using Ethernet port 130; and WiFi communications using WiFi antenna 154.

For example, as shown in FIG. 2A, network selector switch 110 may be rotated with an indicator pointing to PSTN communications to select communications over a public switched telephone network (PSTN). With the network selector switch 110 pointing to PSTN communications, the reach-back communications terminal 100 is configured to access a PSTN through PSTN port 125.

FIG. 2B shows a top panel view of the reach-back communications terminal 100, in accordance with the principles of the present invention.

In particular, as shown in FIG. 2B, the reach-back communications terminal 100 further comprises a personality faceplate keypad 146, a personality faceplate 145, a personality faceplate display 147, an integrated telephone handset 176 and an integrated telephone handset keypad 175.

The integrated telephone handset 176 and integrated telephone keypad 175 are used as conventional telephone handsets and telephone keypads in conducting telephone conversations and dialing a destination telephone number. Calls using the integrated telephone handset 176 are capable of NSA Type 1 or Type 4, AES encryption using the encryption circuitry within the personality faceplate 145.

The personality faceplate 145 contains the necessary encryption circuitry for the reach-back communications terminal 100, fitting into a mounting area cut for the particular encryption device used (i.e., an FNBDT encryptor). The personality faceplate 145 includes a personality faceplate keypad 146 for data entry and a personality faceplate display 147 for allowing a user to visually interface with menu options available on the personality faceplate 145.

The personality faceplate 145 is removably connected to the reach-back communications terminal 100 for convenient replacement with an alternate encryption FNBDT encryptor. Moreover, in the event that the reach-back communications terminal 100 is used in a situation where a user must protect the personality faceplate 145 from being confiscated, the personality faceplate 145 is easily removable for destruction and/or portability.

Figure 2C:
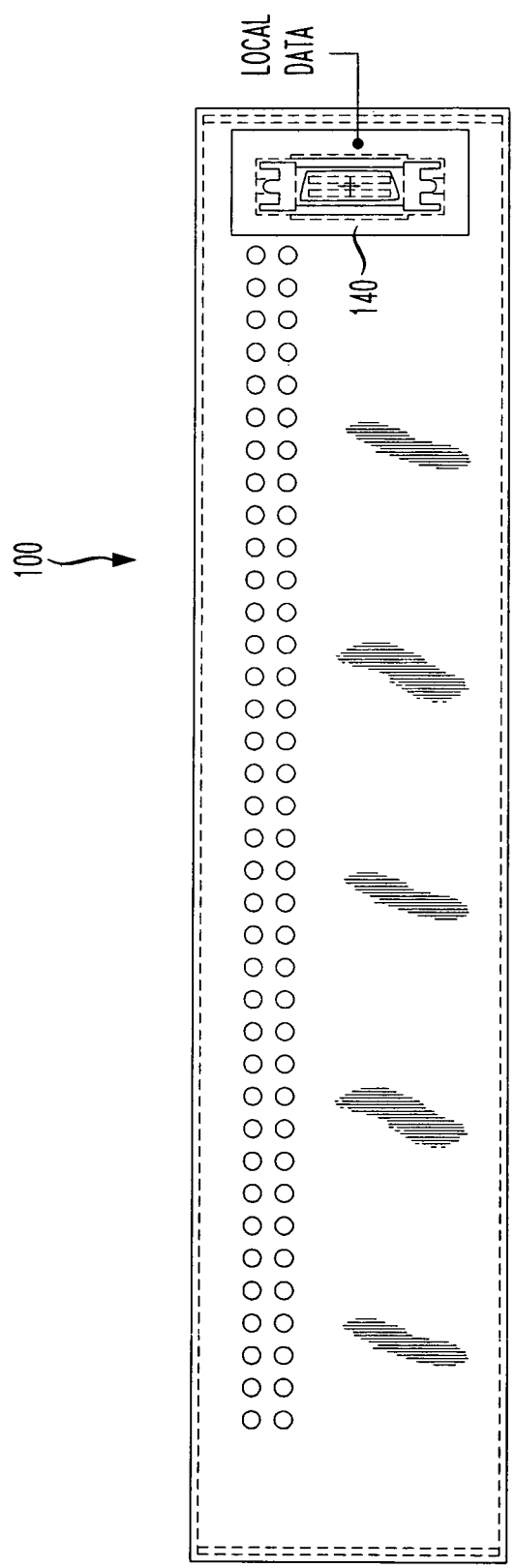
FIG. 2C shows a top/rear view of the reach-back communications terminal, in accordance with the principles of the present invention.

FIG. 2C shows a top/rear view of the reach-back communications terminal 100, in accordance with the principles of the present invention.

In particular, as shown in FIG. 2C, the reach-back communications terminal further comprises a port for connecting secure data from a PC (SDIPC) 140. The SDIPC port 140 is conveniently located on the back of the reach-back communications terminal for interconnectivity with, e.g., a desktop computer, a laptop computer, handheld computers, digital cameras, etc. Preferably, the SDIPC port 140 is an RS-232 serial port. Although an RS-232 serial port is preferable, one of ordinary skill in the art would recognize that the reach-back communications terminal 100 can utilize any of a plurality of computer interfaces without departing from the scope of the invention, e.g., a USB-port.

FIG. 2D(1) shows a rear cut-away view of the reach-back communications terminal, in accordance with the principles of the present invention.

In particular, as shown in FIG. 2D(1), the reach-back communications terminal further comprises a GSM personality card 800 that is accessible through GSM personality card access panel 810 on the bottom of the reach-back communications terminal.

The GSM personality card 800 allows the reach-back communications terminal to be uniquely identified by a GSM network, the same as a conventional GSM telephone contains a personality card 809 to uniquely identify it to a GSM network.

In the event that the GSM personality card 800 needs to be accessed, the GSM personality card is extracted from the reach-back communications terminal 100 and replaced. GSM personality card access panel 810 is recessed on the bottom of the terminal to protect the GSM personality card 800.

In the disclosed embodiment, the GSM personality card 800 is a subscriber identity module (SIM) card, or smart card, installed as part of a GSM cellular phone that encrypts voice and data transmissions and stores data about the specific user so that the user can be identified and authenticated to the relevant GSM network supplying the phone service. The GSM personality (SIM) card 800 also stores data such as personal phone settings specific to the user and phone numbers. A SIM can be moved from one phone to another and/or different SIMs can be inserted into any GSM phone. For example, if a user has one reach-back communications terminal at home, and another at the office, they can carry the GSM personality (SIM) card 800 with them between reach-back communications terminals. Alternatively, multiple GSM personality (SIM) cards 800 may be maintained by the user, and depending upon the context of the secure call (e.g., personal, business, specific contract or mission, etc.), they can swap between their various GSM personality (SIM) cards 800. Of course, multiple users of the reach-back communications terminal can each carry their own GSM personality (SIM) card 800, and install it into the reach-back communications terminal when they desire to use it.

In the disclosed embodiments, despite being a secure, reach-back communications terminal with encryption capability, the GSM personality (SIM) card 800 is preferably nevertheless mounted for easy external access by the user, as shown in FIG. 2D(1). As shown in FIG. 2D(1), a GSM SIM card reader 809 is preferably mounted near a surface of a case enclosing the reach-back communications terminal (e.g., near the bottom surface), with an access opening in the bottom surface allowing a user to easily swap between GSM personality (SIM) cards 800.

FIG. 2D(2) shows a base cut-away view of the reach-back communications terminal, in accordance with the principles of the present invention.

In particular, as shown in FIG. 2D(2), the GSM personality card 800 is alternately viewed from the bottom of the reach-back communications terminal.

While the particular ports, personality cards and switches are shown in various locations and with various names, it will be understood by those of skill in the art that other locations on the reach-back communications terminal 100 may be suitable for any particular port and/or switch, while remaining within the scope of the present invention.

Although a GSM type personality card is discussed herein, it is preferable that any of various types of personality cards can be used with the reach-back communications terminal 100. For example, various personality cards that might be used include T-Mobile, Cingular. Moreover, the reach back communications terminal 100 may be adapted to accommodate a plurality of personality cards to allow for connection to a plurality of cellular networks. For example, OCONUS the user may want to use a personality card suitable for the geographic area, such as for an 1800 MHz network.

Figure 3:
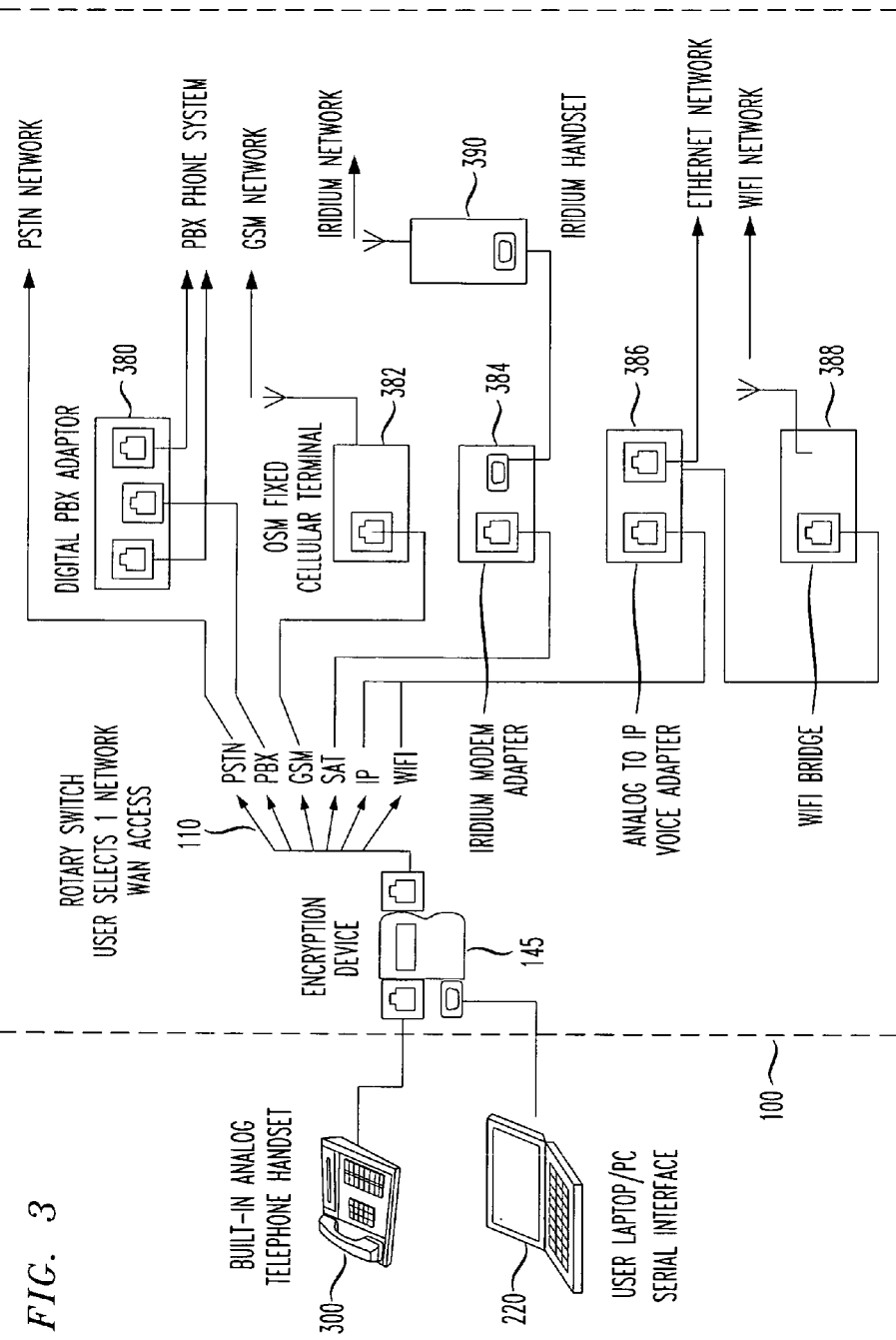
FIG. 3 shows an exemplary configuration for a reach-back communications terminal configured for access to a WAN, in accordance with the principles of the present invention.

FIG. 3 shows an exemplary configuration for a reach-back communications terminal configured for access to a WAN, in accordance with the principles of the present invention.

In particular, as shown in FIG. 3, the disclosed, exemplary reach-back communications terminal 100 further comprises accommodation for connection to a digital PBX via a digital PBX adapter 380, a GSM fixed cellular terminal 382, an Iridium modem via an Iridium modem adapter 384, an analog to IP voice channel via an analog to IP voice adapter 386, and a WiFi bridge 388.

As discussed in relation to FIG. 2A, by rotating the network selector switch 110 to one of a desired WAN, e.g., PSTN, PBX, GSM, SAT, IP and WIFI, respective components within the reach-back communication terminal are activated and internal signals are directed to communicate with the desired network. As the network selector switch 110 is rotated through positions PSTN, PBX, GSM, SAT, IP and WIFI, respective adapters digital PBX adapter 380, GSM fixed cellular terminal 382, Iridium modem adapter 384, analog to IP voice adapter 386, and a WiFi bridge 388 are activated allowing the reach-back communications terminal 100 to communicate with the chosen network.

Depending on the position of the network selector switch 110, PBX telephone deskset 300, personal computer 220 and a satellite handset 390, e.g., an Iridium handset, are selectively configured by the reach-back communications terminal 100 for communicating with a respective network.

PSTN Communications

FIG. 4 shows the disclosed embodiment of a reach-back communications terminal 100 set up to establish voice communications through a PSTN network, in accordance with the principles of the present invention.

In particular, as shown in FIG. 4, a PSTN network is accessed directly from the front panel of the reach-back communications terminal 100 through a PSTN wall line jack 200. The integrated telephone handset 176 is used to make unencrypted voice calls, similarly as with a conventional telephone. The integrated telephone handset keypad 175 is used to dial a target telephone number.

To establish an unencrypted voice call over a PSTN connection, network selector switch 110 is set to the PSTN position. The reach-back communications terminal 100 is connected to the PSTN wall line jack 200 by connecting a conventional PSTN cable 210 to PSTN port 125. The integrated telephone handset keypad 175 is used to dial a destination telephone number. For unencrypted voice calls, the reach-back communications terminal 100 provides not further capability than a conventional PSTN telephone.

To establish an encrypted voice call over a PSTN connection, the network selector switch 110 is set to the PSTN position. The reach-back communications terminal 100 is connected to the PSTN wall line jack 200 by connecting a conventional PSTN cable 210, e.g., an RJ-11 cable, to PSTN port 125. The integrated telephone handset keypad 175 is used to dial a destination telephone number.

To designate a PSTN voice call as being encrypted, a user of the reach-back communications terminal 100 dials a prefix before dialing a destination telephone number. For example, for a secure encrypted telephone call, a user is required to dial "*02*" before dialing the destination telephone number 202-555-1212. Therefore, a user of the reach-back communications terminal 100 dials 02-202-555-1212 to establish a secure encrypted PSTN voice call. If the remote end of the call is configured for "Auto Secure on Answer", the reach-back communications terminal 100 will automatically establish a secure call with the remote end of the call. Alternately, after an unencrypted PSTN voice call is established, one of the calling parties must press "SECURE" on the personality faceplate keypad 146 to change the unencrypted PSTN voice call to an encrypted PSTN voice call.

FIG. 4 shows:
PSTN VOICE CALL
CLEAR
  CABLES
    CONNECT AC POWER AND SWITCH POWER ON
    CONNECT ONE END OF AN RJ-11 TELEPHONE CORD TO "PSTN IN" JACK ON THE SWL1400 AND THE OTHER END TO A WALL JACK
  SWITCH
    SET NETWORK SELECTOR TO PSTN
  ANTENNAS
    N/A
  INTERFACE
    PICK UP HANDSET, USE SWL 1400 TELEPHONE KEYPAD TO DIAL
ENCRYPTED
  CABLES
    CONNECT AC POWER AND POWER ON SWL1400
    CONNECT ONE END OF AN RJ-11 TELEPHONE CORD TO "PSTN IN" JACK ON THE SWL1400 AND THE OTHER END TO A WALL JACK
  SWITCH
    SET TO PSTN
  ANTENNAS
    N/A
  INTERFACE
    PICK UP SWL1400 TELEPHONE HANDSET AND USE SWL1400 TELEPHONE KEYPAD TO DIAL IF THE REMOTE END IS CONFIGURED FOR "AUTO SECURE ON ANSWER", THE SECTERA OR TALKSECURE WILL ESTABLISH A SECURE CALL WITH THE REMOTE END
    OR
    AFTER THE CLEAR CALL IS ESTABLISHED, ONE OF THE CALLING PARTIES MUST PRESS "SECURE" ON THE ENCRYPTOR PAD TO CHANGE TO SECURE MODE FIG. 5 shows the reach-back communications terminal 100 set up to establish data communications through a PSTN network, in accordance with the principles of the present invention.

Figure 5:
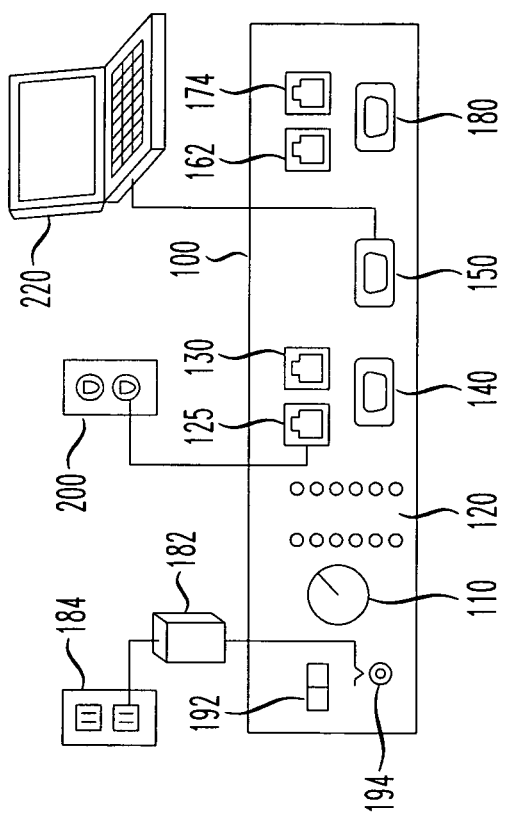
FIG. 5 shows the reach-back communications terminal set up to establish data communications through a PSTN network, in accordance with the principles of the present invention.

In particular, as shown in FIG. 5, to establish an unencrypted data call over a PSTN connection, the network selector switch 110 is set to the PSTN position. A serial cable or USB cable 230 is used to connect a personal computer 220 to the SDIPC 140 of the reach-back communications terminal 100. The personal computer 220 must be set to recognize an external modem within the reach-back communications terminal 100. The personal computer 220 is used to dial into a remote site.

To establish an encrypted data call over a PSTN connection, the network selector switch 110 is set to the PSTN position. A serial cable or USB cable 230 is used to connect a personal computer 220 to the SDIPC 140 of the reach-back communications terminal 100. The personal computer 220 must be set to recognize an external modem within the reach-back communications terminal 100. A data application on the personal computer 220 is used to dial into a remote site.

If the remote end of the call is configured for "Auto Secure on Answer", the reach-back communications terminal 100 will automatically establish a secure PSTN data call between the personal computer 220 and a remote computer. Alternately, a user can toggle a "Secure Select" option on a configuration menu on the reach-back communications terminal 100. Instructions are then given to the user of the reach-back communications terminal 100 for placing an encrypted PSTN data call.

FIG. 5 shows:
PSTN DATA CALL
CLEAR
  CABLES
    CONNECT AC POWER AND SWITCH POWER ON
    CONNECT RJ-11 TELEPHONE CORD TO "PSTN IN" AND WALL JACK
    CONNECT THE DB-9 END OF A SERIAL CABLE TO THE "SECURE DATA IN FROM PC" PORT OF THE SWL1400 AND THE OTHER END TO THE SERIAL PORT OF THE PC. BE CERTAIN THE COM PORT IS SET UP TO RECOGNIZE THE SWL1400 EXTERNAL MODEM (SET UP AS A 9600 GENERIC MODEM).
SWITCH
  SET TO PSTN
ANTENNAS N/A
INTERFACE
  ENABLE ALLOW CLEAR DATA FROM SECURITY MENU.
  ON THE PC, USE THE DATA APPLICATION (E.G., WINDOWS DIAL-UP CONNECTION OR HYPERTERMINAL) TO DIAL INTO THE REMOTE SITE.
ENCRYPTED
  CABLES
    CONNECT AC POWER AND SWITCH POWER ON SWL1400
    CONNECT RJ-11 TELEPHONE CORD TO "PSTN IN" AND WALL JACK.
    CONNECT A SHIELDED DB-9 SERIAL CABLE TO THE "SECURE DATA IN FROM PC" PORT OF THE SWL1400 AND THE OTHER END TO THE SERIAL PORT OR USB PORT OF THE PC.
SWITCH
  SET TP PSTN
ANTENNAS
  N/A
INTERFACE
  ON THE PC, USE THE DATA APPLICATION (E.G., WINDOWS DIAL-UP CONNECTION OR HYPERTERMINAL) TO DIAL INTO THE REMOTE SITE.
  THE REMOTE END MAY BE CONFIGURED WITH "AUTO ANSWER DATA" ENABLED (AUTO ANSWER RING MAY BE USED TO SPECIFY THE NUMBER OR RINGS BEFORE AUTO ANSWER DATA ANSWERS CALL) OR REMOTE END CAN USE THE DATA APPLICATION (AT COMMAND ATA) TP ANSWER.
OR
  TOGGLE SECURE SELECT ON CONFIG MENU TO DATA OPTION.
  THEN, FOLLOW PROCEDURES FOR PLACING ENCRYPTED PSTN SECURE VOICE CALL TO ESTABLISH SECURE DATA CALL.

PBX Communications

FIG. 6 shows the reach-back communications terminal 100 set up to establish voice communications through a PBX network, in accordance with the principles of the present invention.

In particular, as shown in FIG. 6, a PBX is accessed by the reach-back communications terminal 100 through a PBX telephone deskset 300 connected to a PBX wall plate 320. A PBX handset cord 340, e.g., an RJ-13, conventionally connected to a PBX handset 310 is disconnected and plugging into the PBX handset port 162 on the reach-back communications terminal 100. A PBX deskset handset jack that is conventionally connected to the PBX handset 310 is instead connected to the PBX base port 174 using an appropriate cable, e.g., an RJ-13 telephone cord. The PBX telephone keypad 350 on the PBX telephone deskset 300 is used to perform dialing functions for calls using a PBX network.

Figure 6A:
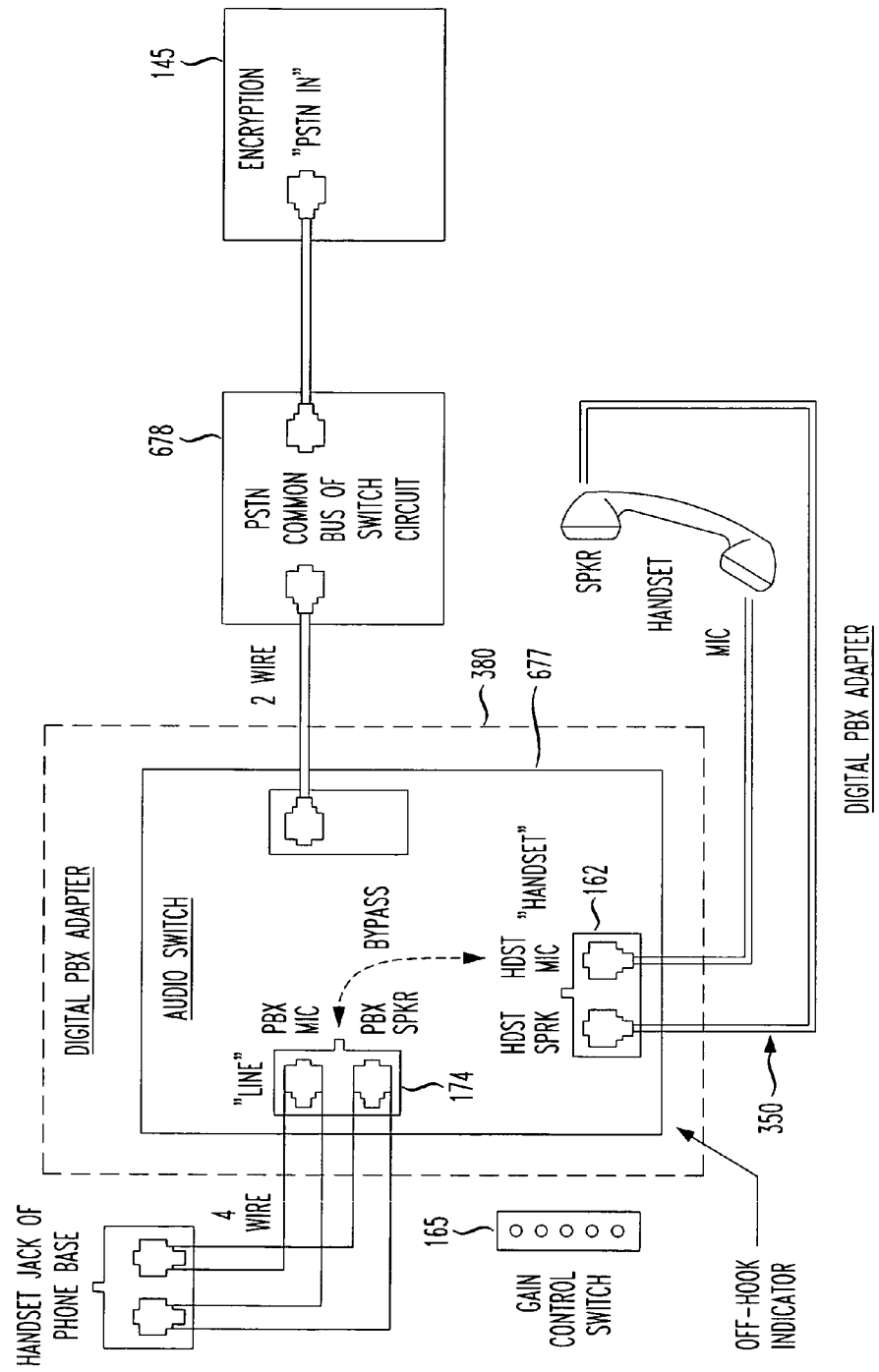
FIG. 6A depicts a digital PBX connection with a PBX base unit, the handset of the PBX base unit, and a PSTN common bus/circuit switch connected in turn to an encryption unit, in accordance with the principles of the present invention.

FIG. 6A depicts a digital PBX adapter connected with a PBX base unit, the handset of the PBX base unit, and a PSTN common bus/circuit switch connected in turn to an encryption unit, in accordance with the principles of the present invention.

In particular, as shown in FIG. 6A, the reach-back communications terminal 100 includes a digital PBX adapter 380 comprised largely of an audio switch 677. The audio switch 677 has an adjustable output gain, controlled by the 4-position switch 165. The adjustable gain is formed using, e.g., a well known resistor ladder circuit. While the adjustable gain control switch 165 in the exemplary embodiment has 4 positions, in graduated gain increments, more (or even fewer) gain selections within the audio switch 677 are also contemplated within the principles of the present invention.

The correct position of the adjustable gain switch 165 is empirically determined. The user will hear a reverb effect in the headset based on the volume capability of the PBX system. The FNBDT encryptor of the reach-back communications terminal 100 won't be able to establish modem communications with another FNBDT or STE encryptor if the PBX adjustable gain control switch is not properly set.

In the given embodiment, the gain control switch 165 is initially set in a common position (e.g., position 3). If the FNBDT encryptor is able to establish communications, then the setting is proper. If not, then the user manually switches the position of the gain control switch 165 to, e.g., position 2, and tries again to establish secure communications again. Again, if the communications are established, then position 2 is proper for the particular PBX being used. If not, then the user may manually move the gain control switch to, e.g., position 1 and try again. Position 4 may be tried after position 1.

The particular order of positions of the gain control switch 165 are for exemplary purposes only.

The LINE phone jack 174 of the digital PBX adapter 380 is wired to the vacated handset jack on the phone base unit using, e.g., a standard coiled handset cord. The handset that was disconnected from the base unit is then rewired into the HANDSET phone jack 162 of the digital PBX adapter 380 using, e.g., a standard coiled handset cord.

The output of the audio switch 677 is connected internal to the reach-back communications terminal 100 to a PSTN common bus of a switching circuit 678, which in the PBX mode switches a 2-wire connection from the digital PBX adapter 380 to the PSTN IN input of the encryption device 145 (i.e., FNBDT encryptor). Other inputs to the PSTN common bus of the switch circuit 678 (e.g., GSM modem, etc.) are not shown in FIG. 6A for simplicity.

When the handset of the PBX is in an OFF hook condition, in an unsecure mode, then optical relays close to cause a bypass in the audio switch 677. Thus, in the OFF hook condition, the PBX handset can be used to communicate with its handset base in an otherwise conventional fashion. Encrypted communications may take place through the FNBDT encryptor.

To make an unsecured PBX voice call, the reach-back communications terminal 100 does not provide any further capability beyond using the PBX telephone deskset 300. The integrated telephone handset 176 is used to dial a destination telephone number and converse with a called party.

To make a secured PBX voice call, the network selector switch 110 is set to the PBX position. The PBX handset 310 is taken off-hook. The PBX telephone keypad 350 is used to dial a destination telephone number. Once a call is established with a destination telephone number, the integrated telephone handset 176 is used to converse with the called party.

If the remote end of the call is configured for "Auto Secure on Answer", the reach-back communications terminal 100 will automatically establish a secure PBX call with the remote end of the call. Alternately, after an unencrypted call is established, one of the calling parties must press "SECURE" on the personality faceplate keypad 146 to change an unencrypted PBX call to a secure encrypted mode.

FIG. 6 shows:
PBX VOICE CALL
CLEAR
   FOR CLEAR PBX VOICE CALLS, THE SWL1400 DOES NOT PROVIDE ANY FURTHER CAPABILITY BEYOND USING THE PBX TELEPHONE HANDSET DIRECTLY.
ENCRYPTED
   CABLES
      CONNECT AC POWER AND POWER ON SWL1400
      ON THE PBX TELEPHONE UNIT, DISCONNECT THE PBX TELEPHONE HANDSET AT THE HANDSET AND PLUG IT INTO THE SWL1400 PBX LINE JACK.
      CONNECT AND RJ-13 TELEPHONE CORD FROM THE SWL1400 PBX HANDSET JACK TO THE PBX PHONE HANDSET JACK.
   SWITCH
      SET TO PBX
   ANTENNAS
      N/A
   INTERFACE
      PICK UP SWL1400 TELEPHONE HANDSET AND HOLD ONTO IT—YOU'LL USE IT TO MAKE THE CALL.
      PICK UP THE PBX TELEPHONE HANDSET AND LEAVE IT OFF-HOOK. USE THE PBX KEYPAD TO DIAL THE REMOTE END TELEPHONE NUMBER (REMEMBER TO PROCEED THE NUMBER WITH THE NUMBER TO CALL OUT OF THE PBX SYSTEM—USUALLY A "9". IF THE REMOTE END IS CONFIGURED FOR "AUTO SECURE ON ANSWER", THE SECTERA OR TALKSECURE WILL ESTABLISH A SECURE CALL WITH THE REMOTE END
      OR
      AFTER THE CLEAR CALL IS ESTABLISHED, ONE OF THE CALLING PARTIES MUST PRESS "SECURE" ON THE ENCRYPTOR PAD TO CHANGE TO SECURE MODE.

Figure 7:
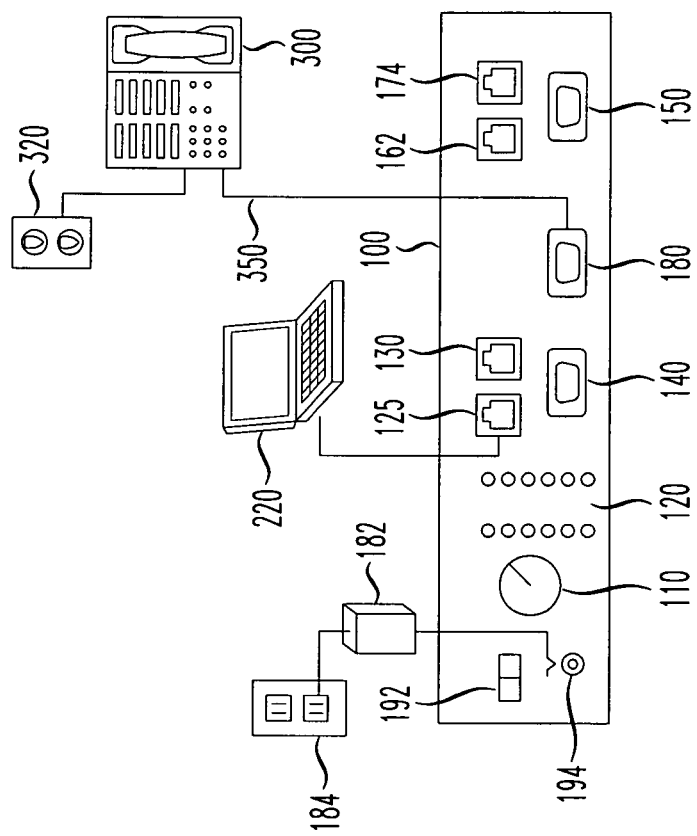
FIG. 7 shows the reach-back communications terminal set up to establish data communications through a PBX network, in accordance with the principles of the present invention.

FIG. 7 shows the reach-back communications terminal 100 set up to establish data communications through a PBX network, in accordance with the principles of the present invention.

In particular, as shown in FIG. 7, to make an unsecured PBX data call, the network selector switch 110 is set to the PBX position. A menu option on the personality faceplate 145 is chosen to allow unencrypted data communications. A PBX network is accessed by the personal computer 220 through the reach-back communications terminal 100 through the PBX telephone deskset 300 connected to a PBX wall plate 320. The PBX handset cord 340 connected to a PBX handset 310 is disconnected and plugging into the PBX handset port 162 on the reach-back communications terminal 100. A PBX deskset handset jack that is conventionally connected to the PBX handset 310 is instead connected to the PBX base port 174 using an appropriate cable, e.g., an RJ-13 telephone cord. Personal computer 220 is connected to the SDIPC 140 using a serial cable or USB cable 230.

Both the integrated telephone handset 176 and the PBX handset 310 are left off-hook. The personal computer 220 must be set to recognize an external modem within the reach-back communications terminal 100. The PBX telephone keypad 350 is used to dial a destination telephone number. After dialing the destination telephone number on the PBX telephone keypad 350, a data application on the personal computer 220 is initiated to make a data link call.

To make an encrypted PBX data call, the network selector switch 110 is set to the PBX position. The PBX handset 310 is disconnected from the PBX telephone unit's handset jack and connected to the reach-back communications terminal's 100 PBX handset port 162. The PBX telephone unit's 300 handset jack is connected to the reach-back communications terminal's 100 PBX base port 174 using an appropriate cable, e.g., an RJ-13 telephone cord. The personal computer 220 is connected to the SDIPC 140 using cable 230. Both the integrated telephone handset 176 and the PBX telephone handset 310 are left off-hook.

The personal computer 220 must be set to recognize an external modem within the reach-back communications terminal 100. The PBX telephone keypad 350 is used to dial a destination telephone number. After dialing the destination telephone number on the PBX keypad 350, a data application on the personal computer 220 is initiated to make a data link call.

If the remote end of the call is configured for "Auto Secure on Answer", the reach-back communications terminal 100 will automatically establish a secure PBX data call between the personal computer 220 and a remote computer. Alternately, a user can toggle a "Secure Select" option on a configuration menu on the reach-back communications terminal 100. Instructions are then given to the user of the reach-back communications terminal 100 for placing an encrypted PBX data call.

FIG. 7 shows:
PBX DATA CALL
CLEAR
   CABLES
      CONNECT AC POWER AND SWITCH POWER ON THE SWL1400
      DISCONNECT THE PBX TELEPHONE HANDSET JACK CORD AT THE HANDSET AND PLUG IT INTO THE SWL1400 PBX LINE JACK CONNECT THE RJ-13 TELEPHONE CORD FROM THE SWL1400 PBX HANDSET PORT TO THE PBX PHONE HANDSET JACK CONNECT THE DB-9 END OF A SHIELDED SERIAL CABLE TO THE "SECURE DATA IN FROM PC" PORT OF THE SWL1400 AND THE OTHER END TO THE SERIAL OR USB PORT OF THE PC. BE CERTAIN COM PORT IS SET UP TO RECOGNIZE THE SWL 1400 EXTERNAL MODEM (SET UP AS 9600 BPS GENERIC MODEM).

SWITCH
  SET TO PBX
ANTENNAS
  N/A
INTERFACE
  ENABLE ALLOW CLEAR DATA FROM SECURITY MENU.
  ON THE PC, SET UP THE DATA APPLICATION (E.G. WINDOWS DIAL-UP CONNECTION OR HYPERTERMINAL) TO DIAL INTO REMOTE SITE.
  PICK UP SWL1400 TELEPHONE HANDSET AND LEAVE IT OFF-HOOK.
  PICK UP THE PBX TELEPHONE HANDSET AND LEAVE IT OFF-HOOK.
  USING THE KEYPAD ON THE PBX TELEPHONE, DIAL THE DESTINATION TELEPHONE NUMBER (REMEMBER TO ENTER THE NUMBER TO GET OUT OF THE PBX—USUALLY A "9"-PRIOR TO ENTERING THE TELEPHONE NUMBER.
  AFTER YOU'VE DIALED THE NUMBER ON THE HANDSET, CLICK ON THE CONNECT BUTTON ON THE DIAL-UP WINDOW TO INITIATE THE DAT CALL LINK.

ENCRYPTED
  CABLES
    FOLLOW INTRUSIONS FOR CABLES IN CLEAR PBX DATA CALL ABOVE.
  SWITCH
    SET TO PBX
  ANTENNAS
    N/A
  INTERFACE
    ON THE PC, SET UP THE DATA APPLICATION (E.G., WINDOWS DIAL-UP CONNECTION OR HYPERTERMINAL) TO DIAL INTO THE REMOTE SITE.
    PICK UP SWL1400 TELEPHONE HANDSET AND LEAVE IT OFF THE HOOK. PICK UP THE PBX TELEPHONE HANDSET AND LEAVE IT OFF THE HOOK.
    USING THE KEYPAD ON THE PBX TELEPHONE, DIAL THE DESTINATION TELEPHONE NUMBER (REMEMBER TO PRECEDE THE NUMBER WITH THE NUMBER TO CALL OUT OF THE PBX SYSTEM—USUALLY A "9". AFTER INITIATING THE CALL, CLICK ON THE CONNECT BUTTON ON THE DIAL-UP WINDOW.
    THE REMOTE END MAY BE CONFIGURED WITH "AUTO ANSWER DATA" ENABLED (AUTO ANSWER RING MAY BE USED TO SPECIFY THE NUMBER OF RINGS BEFORE THE AUTO ANSWER DATA ANSWERS CALL) OR REMOTE END CAN USE THE DATA APPLICATION (AT COMMAND ATA) TO ANSWER.
    OR
    TOGGLE SECURE SELECT ON CONFIG MENU TO DATA OPTION. THEN, FOLLOW PROCEDURES FOR PLACING ENCRYPTED PBX SECURE VOICE CALL TO ESTABLISH SECURE DATA CALL.

GSM Communications

Figure 8:
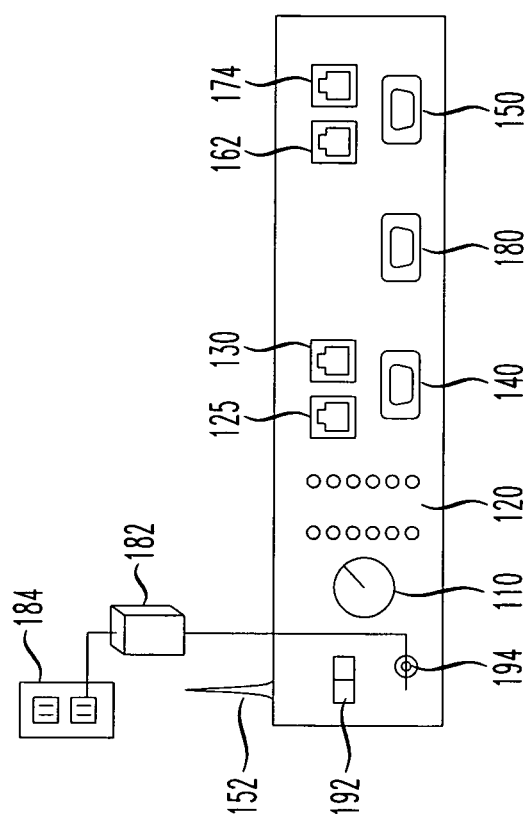
FIG. 8 shows the reach-back communications terminal set up to establish voice communications through a GSM network, in accordance with the principles of the present invention.

FIG. 8 shows the reach-back communications terminal 100 set up to establish voice communications through a GSM network, in accordance with the principles of the present invention.

In particular, as shown in FIG. 8, the GSM antenna 152 allows cellular communications to be established using any of four cellular frequencies. In particular, the GSM antenna 152 allows communications at frequencies of 850 MHz at 2.2 dBi, 900 MHz at 2.2 dBi, 1800 MHz at 3 dBi and 1900 MHz at 3 dBi over approved circuit-switched digital networks.

To initiate a secure call over a circuit switched data network and not a GPRS network, a number designation proceeds the entry of a telephone number, e.g., "*02*". To receive a secure message, the call initiator must use a designated number assigned to the reach-back communications terminal 100. The reach-back communications terminal 100 conveniently has a separate non-secure GSM/GPRS data port 180 to allow users unencrypted access to a GPRS network if desired.

To establish an unencrypted voice call using a GSM network, the network selector switch 110 is set to the GSM position. The GSM antenna 152 is set up to optimize communications with a GSM network. The status indicator lights 120 will indicate that the reach-back communications terminal 100 is receiving a GSM signal. To allow a user of the reach-back communications terminal 100 to determine the strength of the signal, an LED indicator on the status indicator lights 120 will flash sequentially from one to four times to indicate the strength of the GSM signal. Alternately, a solid non-flashing LED indicator on the status indicator lights 120 will indicate a strong signal.

The integrated telephone handset 176 and the integrated telephone handset keypad 175 are used to dial and conduct conversations during an unencrypted voice call established over a GSM network.

To establish an encrypted GSM voice call, the network selector switch 110 is set to the GSM position. The GSM antenna 152 is set up to optimize communications with a GSM network. The status indicator lights 120 will indicate that the reach-back communications terminal 100 is receiving a GSM signal. To allow a user of the reach-back communications terminal 100 to determine the strength of the signal, an LED indicator on the status indicator lights 120 will flash sequentially from one to four times to indicate the strength of the GSM signal. Alternately, a solid non-flashing LED indicator on the status indicator lights 120 will indicate a strong signal.

The integrated telephone handset 176 and the integrated telephone handset keypad 175 are used to dial and conduct conversations during an encrypted telephone call established over a GSM network. To designate a telephone call as being encrypted, a user of the reach-back communications terminal 100 dials a prefix before dialing a destination telephone number. For example, for a secure encrypted telephone call, a user is required to dial "*02*" before dialing the destination telephone number 202-555-1212. Therefore a user of the reach-back communications terminal 100 dials *02*-202-555-1212 to establish a secure encrypted telephone call. If the remote end of the call is configured for "Auto Secure on Answer", the reach-back communications terminal 100 will automatically establish a secure call with the remote end of the call.

FIG. 8 shows:

GSM VOICE CALL
CLEAR
  CABLES
    CONNECT AC POWER AND SWITCH POWER ON SWL1400
  SWITCH
    SET TO GSM
  ANTENNAS
    SET UP GSM ANTENNA AND WATCH FOR LED SIGNAL THAT THE GSM SIGNAL IS BEING RECEIVED (FLASHING GRN INDICATES THAT A SIGNAL IS BEING RECEIVED; THE HIGHEST NUMBER OF SEQUENTIAL FLASHES (1-4) OR A SOLID GRN INDICATES A STRONG SIGNAL).
  INTERFACE
    PICK UP SWL1400 TELEPHONE HANDSET AND USE SWL1400 KEYPAD TO DIAL
ENCRYPTED
  CABLES
    CONNECT AC POWER AND POWER ON SWL1400
  SWITCH
    SET TO GSM
  ANTENNAS
    SET UP GSM ANTENNA (ON THE LEFT-HAND SIDE) AND WATCH FOR LED SIGNAL THAT THE GSM SIGNAL IS BEING RECEIVED (FLASHING GRN INDICATES THAT A SIGNAL IS BEING RECEIVED; THE HIGHEST NUMBER OF SEQUENTIAL FLASHES (1-4) OR A SOLID GRN INDICATES A STRONG SIGNAL).
  INTERFACE
    PICK UP SWL1400 TELEPHONE HANDSET AND USE SWL1400 KEYPAD TO DIAL. FOR A SECURE CALL, DIAL "02" FOLLOWED BY THE DESTINATION NUMBER (E.G., *02*202-255-1212)—THIS WILL INDICATE THAT YOU WANT TO MAKE A SECURE CALL.
    IF THE REMOTE END IS CONFIGURED FOR "AUTO SECURE ON ANSWER", THE SECTERA OT TALKSECURE WILL ESTABLISH A SECURE CALL WHEN THE REMOTE END PICKS UP THE REMOTE TELEPHONE.
    OR
    WHEN THE REMOTE END PICKS UP THE HANDSET AND HEARS NO VOICE, THE REMOTE END USER MUST PRESS "SECURE" ON THE ENCRYPTOR PAD TO CHANGE TO SECURE MODE.

Figure 9:
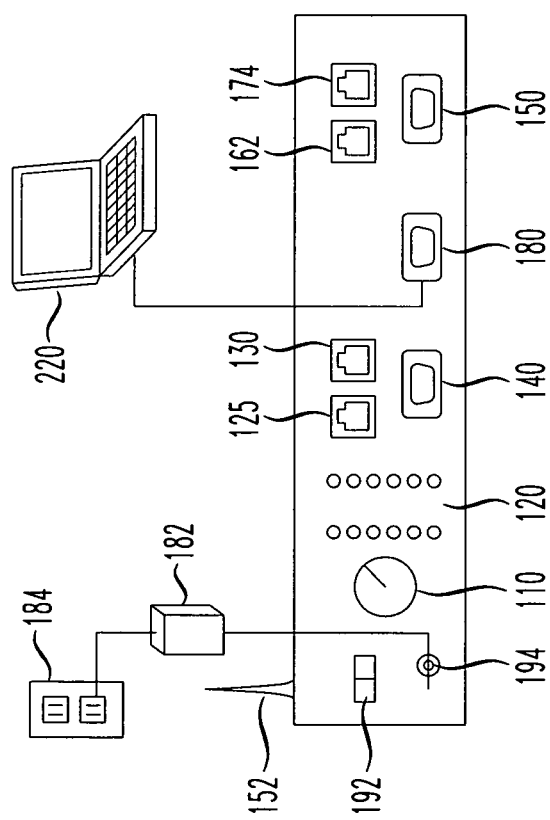
FIG. 9 shows the reach-back communications terminal set up to establish non-secure data communications through a GSM network, in accordance with the principles of the present invention.

FIG. 9 shows the reach-back communications terminal 100 set up to establish non-secure data communications through a GSM network, in accordance with the principles of the present invention.

In particular, as shown in FIG. 9, to establish an unencrypted GSM data call, the network selector switch 110 is set to the GSM position. The GSM antenna 152 is set up to optimize communications with a GSM network. The status indicator lights 120 will indicate that the reach-back communications terminal 100 is receiving a GSM signal. To allow a user of the reach-back communications terminal 100 to determine the strength of the signal, an LED indicator on the status indicator lights 120 will flash sequentially from one to four times to indicate the strength of the GSM signal. Alternately, a solid non-flashing LED indicator on the status indicator lights 120 will indicate a strong signal.

Personal computer 220 is connected to the SDIPC 140 by a serial cable or a USB cable 230. A data application on the personal computer 220 dials into a remote site, with a remote site answering the call with a corresponding data application.

FIG. 9 shows:

GSM NON-SECURE DATA CALL
CLEAR
  CABLES
    CONNECT AC POWER AND SWITCH POWER ON SWL1400
    CONNECT A DB-9 SERIAL CABLE TO THE "NON-SECURE GSM DATA IN" PORT OF THE SWL1400 AND THE OTHER END TO THE SERIAL PORT OR USB PORT OF THE PC.
  SWITCH
    SET TO GSM
  ANTENNAS
    SET UP GSM ANTENNA (ON THE LEFT-HAND SIDE) AND WATCH FOR LED SIGNAL THAT THE GSM SIGNAL IS BEING RECEIVED (FLASHING GRN INDICATES THAT A SIGNAL IS BEING RECEIVED; THE HIGHEST NUMBER OF SEQUENTIAL FLASHES (1-4) OR A SOLID GRN INDICATES A STRONG SIGNAL).
  INTERFACE
    ON THE PC, USE THE DATA APPLICATION (E.G., WINDOWS DIAL-UP CONNECTION OR HYPERTERMINAL) TO DIAL INTO THE REMOTE SITE.
    REMOTE USER MUST ANSWER USING DATA APPLICATION (AT COMMAND ATA)

Figure 10:
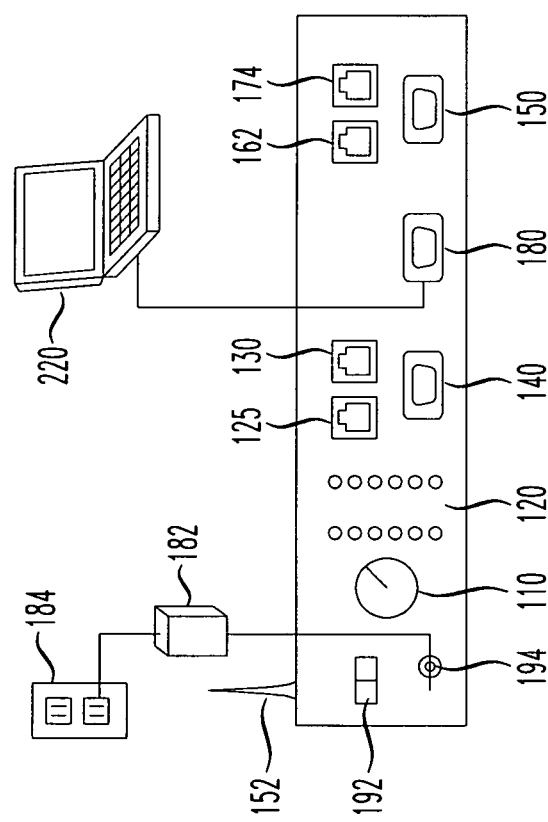
FIG. 10 shows the reach-back communications terminal set up to establish secure data communications through a GSM network, in accordance with the principles of the present invention.

FIG. 10 shows the reach-back communications terminal 100 set up to establish secure data communications through a GSM network, in accordance with the principles of the present invention.

In particular, as shown in FIG. 10, to establish an encrypted GSM data call, the network selector 110 is set to the GSM position. A serial cable or USB cable 230 is used to connect the personal computer 220 to the SDIPC 140. The GSM antenna 152 is set up to optimize communications with a GSM network. The status indicator lights 120 will indicate that the reach-back communications terminal 100 is receiving a GSM signal. To allow a user of the reach-back communications terminal 100 to determine the strength of the signal, an LED indicator on the status indicator lights 120 will flash sequentially from 1 to 4 times to indicate the strength of the GSM signal. Alternately, a solid non-flashing LED indicator on the status indicator lights 120 will indicate a strong signal.

A data application on the personal computer 220 is used to dial a remote site. The data application dials a prefix to designate a telephone call as being encrypted. For example, for a secure encrypted telephone call, the data application is required to dial "*02*" before dialing the destination telephone number 202-555-1212. Therefore the data application dials *02*-202-555-1212 to establish a secure encrypted telephone call. If the remote end of the call is configured for "Auto Secure on Answer", the reach-back communications terminal 100 will automatically establish a secure call with the remote end of the call. Alternately, when an encrypted call is received, the receiving party must press "SECURE" on the personality faceplate keypad 146 to receive an encrypted GSM call.

FIG. 10 shows:
GSM SECURE DATA CALL
ENCRYPTED
  CABLES
    CONNECT AC POWER AND SWITCH POWER ON SWL1400
    CONNECT A SHIELDED DB-9 SERIAL CABLE TO THE "SECURE DATA IN FROM PC" PORT OF THE SWL1400 AND THE OTHER END TO THE SERIAL PORT OF THE PC.
  SWITCH
    SET TO GSM
  ANTENNAS
    SET UP GSM ANTENNA (ON THE LEFT-HAND SIDE) AND WATCH FOR LED SIGNAL THAT THE GSM SIGNAL IS BEING RECEIVED (FLASHING GRN INDICATES THAT A SIGNAL IS BEING RECEIVED: THE HIGHEST NUMBER OF SEQUENTIAL FLASHES (1-4) OR A SOLID GRN INDICATES A STRONG SIGNAL).
  INTERFACE
    ON THE PC, USE THE DATA APPLICATION (E.G., WINDOWS DIAL-UP CONNECTION OR HYPERTERMINAL) TO DIAL INTO THE REMOTE SITE. DIAL *02* FOLLOWED BY THE DESTINATION TELEPHONE NUMBER (E.G., *02*202-255-1212)
    THE REMOTE END MAY BE CONFIGURED WITH "AUTO ANSWER DATA" ENABLED (AUTO ANSWER RING MAY BE USED TO SPECIFY THE NUMBER OR RINGS BEFORE AUTO ANSWER DATA ANSWERS CALL) OR REMOTE END CAN USE THE DATA APPLICATION (AT COMMAND ATA) TO ANSWER.
    OR
    TOGGLE SECURE SELECT ON CONFIG MENU TO DATA OPTION. THEN, FOLLOW PROCEDURES FOR PLACING ENCRYPTED GSM VOICE CALL TO ESTABLISH SECURE DATA CALL.

IP Communications

Figure 11:
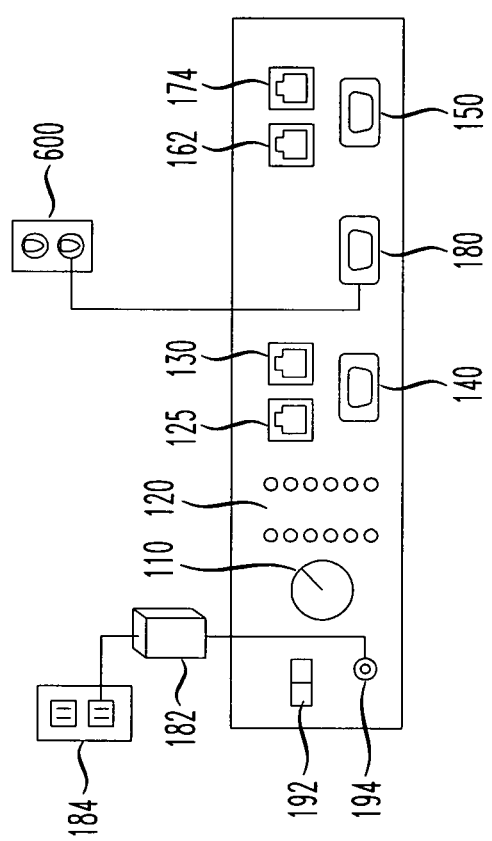
FIG. 11 shows the reach-back communications terminal set up to establish IP voice communications over an IP network, in accordance with the principles of the present invention.

FIG. 11 shows the reach-back communications terminal 100 set up to establish IP voice communications over an IP network, in accordance with the principles of the present invention.

In particular, as shown in FIG. 11, ethernet port 130 allows the reach-back communications terminal 100 to connect over any IP network, preferably supporting Dynamic Host Configuration Protocol (DHCP) addressing. Alternately, the reach-back communications terminal 100 can utilize a static IP address. To obtain a dynamically assigned IP address once connected to an IP network, the reach-back communications terminal 100 requests an IP address from the network. Alternately, a static IP address can be assigned to the reach-back communications terminal 100 for connection to an IP network.

To establish an IP unencrypted voice call using an IP connection, the network selector switch 110 is set to the IP position. Ethernet port 130 is connected to a conventional local area network (LAN) wall plate 600 using an appropriate cable, e.g., CAT 5, CAT 6, etc. The integrated telephone handset keypad 175 is used to dial a destination telephone number.

To establish an IP encrypted voice call using an IP connection, the network selector switch 110 is set to the IP position. Ethernet port 130 is connected to a LAN wall plate 600 using an appropriate cable, e.g., CAT 5, CAT 6, etc. The integrated telephone handset keypad 175 is used to dial a destination telephone number.

If the remote end of the call is configured for "Auto Secure on Answer", the reach-back communications terminal 100 will automatically establish a secure call with the remote end of the call.

FIG. 11 shows:
IP VOICE CALL
CLEAR
  CABLES
    CONNECT AC POWER AND POWER ON SWL1400
    CONNECT AN RJ-45 JACK TO THE ETHERNET PORT OF THE SWL1400 AND THE OTHER END TO A LAN PORT.
  SWITCH
    SET TO IP
  ANTENNA
    N/A
  INTERFACE
    PICK UP SWL1400 TELEPHONE HANDSET AND USE SWL1400 KEYPAD TO DIAL. PRECEDE THE TELEPHONE NUMBER WITH *99 TO USE THE HIGHER RATE CODEC AND A 1 (E.G., *99, 1202-555-1212).
ENCRYPTED
  CABLES
    CONNECT AC POWER AND POWER ON SWL1400
    CONNECT AN RJ-45 JACK TO THE ETHERNET PORT OF THE SWL1400 AND THE OTHER END TO A LAN PORT
  SWITCH
    SET TO IP
  ANTENNA
    N/A
  INTERFACE
    PICK UP SWL1400 TELEPHONE HANDSET AND USE SWL1400 KEYPAD TO DIAL: THE SIGNAL LED ON THE IP NETWORK INDICATOR SHOULD LIGHT SOLID GREEN. PRECEDE THE TELEPHONE NUMBER WITH *99 TO USE A HIGHER RATE CODEC (E.G., *99, 1202-555-1212).
    IF THE REMOTE END IS CONFIGURED FOR AUTO SECURE ON ANSWER, THE SECTERA OF TALK SECURE WILL ESTABLISH A SECURE CALL WITH THE REMOTE END
    OR
    AFTER THE CONNECTION IS ESTABLISHED, ON THE CALLING PARTIES MUST PRESS THE "SECURE" BUTTON TO GO SECURE.

Figure 12:
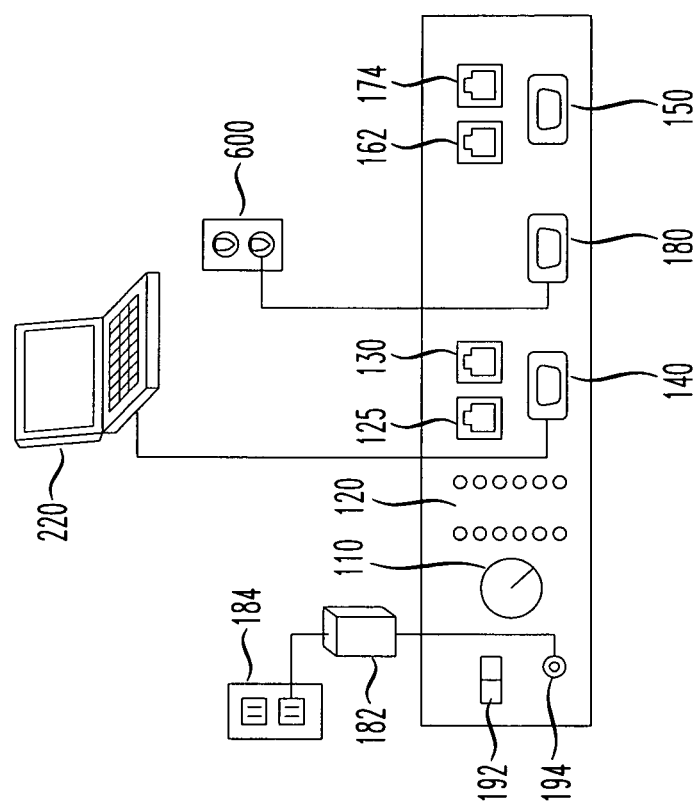
FIG. 12 shows the reach-back communications terminal set up to establish IP data communications over an IP network, in accordance with the principles of the present invention.

FIG. 12 shows the reach-back communications terminal 100 set up to establish IP data communications over an IP network, in accordance with the principles of the present invention.

In particular, as shown in FIG. 12, to establish an IP unencrypted data call using an IP connection, the network selector switch 110 is set to the IP position. The Ethernet port 130 is connected to a LAN wall plate 400 using an appropriate cable, e.g., CAT 5, CAT 6, etc. A serial cable or USB cable 230 is used to connect the personal computer 220 to the SDIPC 140 of the reach-back communications terminal 100. The personal computer 220 must be set to recognize an external modem within the reach-back communications terminal 100.

A menu option on the personality faceplate 145 is chosen to enable an unsecured data call. A data application on the personal computer 220 is used to dial a destination telephone number.

To establish an IP encrypted data call using an IP connection, the network selector switch 110 is set to the IP position. The Ethernet port 130 on the reach-back communications terminal 100 is connected to a LAN wall plate 400 using an appropriate cable. The integrated telephone handset's 176 integrated telephone handset keypad 175 is used to dial a destination telephone number.

If the remote end of the call is configured for "Auto Secure on Answer", the reach-back communications terminal 100 will automatically establish a secure call with the remote end of the call.

FIG. 12 shows:
IP DATA CALL
CLEAR
  CABLES
    CONNECT AC POWER AND POWER ON SWL1400
    CONNECT A DB-9 SERIAL CABLE TO THE :SECURE DATA IN FROM PC PORT OF THE SWL1400 AND THE OTHER END TO THE SERIAL PORT OR USB PORT OF THE PC.
  SWITCH
    SET TO IP
  ANTENNA
    N/A
  INTERFACE
    ON THE PC, USE THE DATA APPLICATION (E.G., WINDOWS DIAL-UP CONNECTION OR HYPERTERMINAL) TO DIAL INTO THE REMOTE SITE. WHEN ENTERING ENABLE ALLOW CLEAR DATA FROM SECURITY MENU.
    THE TELEPHONE NUMBER OF THE DESTINATION POINT, FIRST TYPE IN *99 THEN ENTER THE TELEPHONE NUMBER OF THE DESTINATION SITE BEGINNING WITH 1 (E.G., *99, 1202-555-1212).
ENCRYPTED
  CABLES
    CONNECT AC POWER AND POWER ON SWL1400
    CONNECT A DB-9 SERIAL CABLE TO THE "SECURE DATA IN FROM PC" PORT OF THE SWL1400 AND THE OTHER END TO THE SERIAL PORT OR USB PORT OF THE PC.
    CONNECT AND RJ-45 JACK TO THE ETHERNET PORT OF THE SWL1400 AND THE OTHER END TO A LAN PORT
  SWITCH
    SET TO IP
  ANTENNA
    N/A
  INTERFACE
    ON THE PC, USE THE DATA APPLICATION (E.G., WINDOWS DIAL-UP CONNECTION OR HYPERTERMINAL) TO DIAL INTO THE REMOTE SITE. WHEN ENTERING THE TELEPHONE NUMBER OF THE DESTINATION POINT, FIRST TYPE IN *99 THEN ENTER THE TELEPHONE NUMBER OF THE DESTINATION SITE (E.G., *99, 1202-555-1212).
    THE REMOTE END MAY BE CONFIGURED WITH "AUTOANSWER DATA" ENABLED (AUTO ANSWER RING MAY BE USED TO SPECIFY THE NUMBER OR RINGS BEFORE AUTO ANSWER DATA ANSWERS CALL) OR REMOTE END CAN USE THE DATA APPLICATION (AT COMMAND ATA) TO ANSWER.
    OR
    TOGGLE SECURE SELECT ON CONFIG MENU TO DATA OPTION. THE, FOLLOW PROCEDURES FOR PLACING ENCRYPTED IP VOICE CALL TO ESTABLISH SECURE DATA CALL.

WiFi Communications

Figure 13:
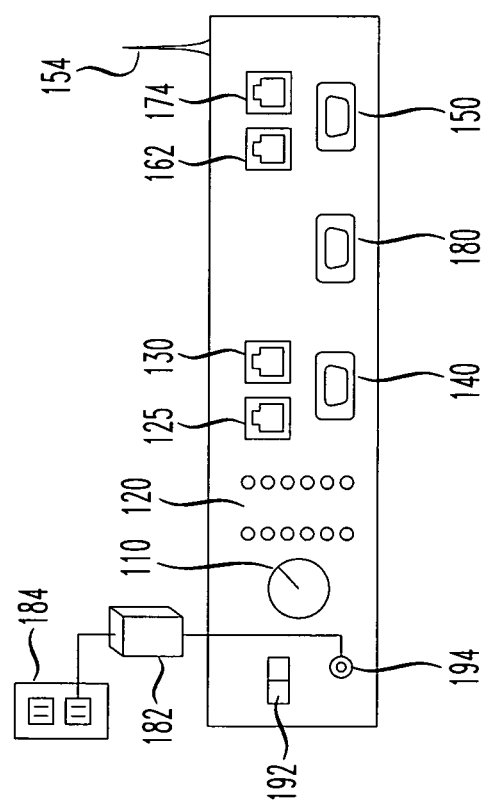
FIG. 13 shows the reach-back communications terminal set up to establish WiFi voice communications over a WiFi network, in accordance with the principles of the present invention.

FIG. 13 shows the reach-back communications terminal 100 set up to establish WiFi voice communications over a WiFi network, in accordance with the principles of the present invention.

In particular, as shown in FIG. 13, the WiFi antenna 154 connects to WiFi circuitry within reach-back communications terminal 100 that allows WiFi communications using a WiFi frequency, e.g. 2400 MHz at 3 dBi. A WiFi interface allows the reach-back communications terminal 100 to establish a secure connection over any IP network, preferably supporting DHCP addressing. Alternately, a static IP address can be assigned to the reach-back communications terminal 100 for connection to an IP network.

To obtain a dynamically assigned IP address once connected to a WiFi network, a WiFi bridge within the reach-back communications terminal 100 requests an IP address from a WiFi network. Secure communications are conducted over the WiFi network using Vonage voice-over-IP (VoIP) service for both voice and data.

To establish a WiFi unencrypted voice call using a WiFi connection, the network selector switch 110 is set to the WiFi position. The WiFi antenna 154 is set up to optimize communications with a WiFi network. The status indicator lights 120 will indicate that the reach-back communications terminal 100 is receiving a WiFi signal. The reach-back communications terminal 100 will automatically pick up an IP address from the WiFi network, possibly taking several minutes. Once a dial tone is available on the integrated telephone handset 176, a destination telephone number is dialed using the integrated telephone handset keypad 175 to established a call over a WiFi network.

To establish a WiFi encrypted voice call using a WiFi connection, the network selector switch 110 is set to the WiFi position. The WiFi antenna 154 is set up to optimize communications with a WiFi network. The status indicator lights 120 will indicate that the reach-back communications terminal 100 is receiving a WiFi signal. The reach-back communications terminal 100 will automatically pick up an IP address from the WiFi network, possibly taking several minutes.

The integrated telephone handset keypad 175 and the integrated telephone handset 176 are used to dial and conduct conversations during an encrypted voice call established over a WiFi network.

If the remote end of the call is configured for "Auto Secure on Answer", the reach-back communications terminal 100 will automatically establish a secure call with the remote end of the call.

FIG. 13 shows:
WIFI VOICE CALL
CLEAR
  CABLES
    CONNECT AC POWER AND SWITCH POWER ON SWL1400
  SWITCH
    SET TO WIFI ANTENNA
   SET UP WIFI ANTENNA (ON THE RIGHT-HAND SIDE) AND WATCH FOR LED SIGNAL THAT THE WIFI SIGNAL IS BEING RECEIVED.
INTERFACE
   PRIOR TO MAKING A CALL YOU WILL NEED TO LET THE SWL1400 PICK UP AN IP ADDRESS FROM THE NETWORK. THIS MAY TAKE SEVERAL MINUTES.
   WHEN YOU HAVE A DIAL TONE USE SWL1400 KEYPAD TO DIAL, (USE A *99 AND 1 PRIOR TO THE NUMBER DIALED, E.G., *99, 1-202-555-1212)
ENCRYPTED
  CABLES
   CONNECT AC POWER AND POWER ON SWL1400
  SWITCH
   SET TO WIFI
  ANTENNA
   SET UP WIFI ANTENNA (ON RIGHT-HAND SIDE) AND WATCH FOR LED SIGNAL THAT THE WIFI SIGNAL IS BEING RECEIVED
  INTERFACE
   PRIOR TO MAKING A CALL YOU WILL NEED TO LET THE SWL1400 PICK UP AN IP ADDRESS FROM THE NETWORK. THIS MAY TAKE SEVERAL MINUTES.
   WHEN YOU HAVE A DIAL TONE USE SWL1400 KEYPAD TO DIAL, (USE A *99 AND 1 PRIOR TO THE NUMBER DIALED, E.G., *99, 1-202-555-1212)
   IF THE REMOTE END IS CONFIGURED FOR AUTO SECURE ON ANSWER, THE SECTERA OR TALKSECURE WILL ESTABLISH A SECURE CALL WITH THE REMOTE END
   OR
   AFTER THE CLEAR CALL IS ESTABLISHED, ONE OF THE CAKING PARTIES MUST PRESS "SECURE" ON THE ENCRYPTOR PAD TO CHANGE TO SECURE MODE.

Figure 14:
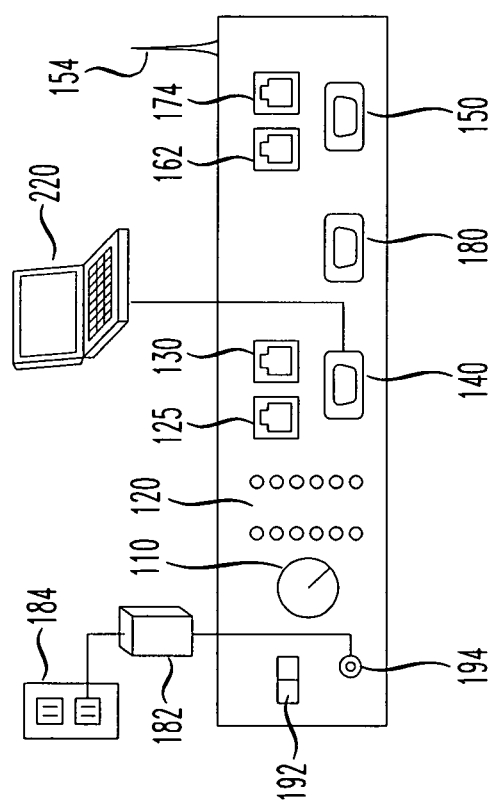
FIG. 14 shows the reach-back communications terminal set up to establish WiFi data communications over a WiFi network, in accordance with the principles of the present invention.

FIG. 14 shows the reach-back communications terminal 100 set up to establish WiFi data communications over a WiFi network, in accordance with the principles of the present invention.

In particular, as shown in FIG. 14, to establish a WiFi unencrypted data call using a WiFi connection, the network selector switch 110 is set to the WiFi position. A menu option on the personality faceplate 145 is chosen to allow unencrypted data communications. The WiFi antenna 154 is set up to optimize communications with a WiFi network. The status indicator lights 120 will indicate that the reach-back communications terminal 100 is receiving a WiFi signal. The reach-back communications terminal 100 will automatically pick up an IP address from the WiFi network, possibly taking several minutes. A serial cable or USB cable 230 is used to connect the personal computer 220 to the SDIPC port 140.

To establish a WiFi encrypted data call using a WiFi connection, the network selector switch 110 is set to the WiFi position. The WiFi antenna 154 is set up to optimize communications with a WiFi network. The status indicator lights 120 will indicate that the reach-back communications terminal 100 is receiving a WiFi signal. The reach-back communications terminal 100 will automatically pick up an IP address from the WiFi network, possibly taking several minutes. A serial cable or USB cable 230 is used to connect the personal computer 220 to the SDIPC 140.

If the remote end of the call is configured for "Auto Secure on Answer", the reach-back communications terminal 100 will automatically establish a secure call with the remote end of the call.

FIG. 14 shows:
WIFI DATA CALL
CLEAR
  CABLES
   CONNECT AC POWER AND SWITCH POWER ON SWL1400
   CONNECT A DB-9 SERIAL CABLE TO THE "SECURE DATA IN FROM PC" PORT OF THE SWL1400 AND THE END TO THE SERIAL PORT OR USB PORT OF THE PC.
  SWITCH
   SET TO WIFI
  ANTENNA
   SET UP WIFI ANTENNA AND WATCH FOR LED SIGNAL THAT THE WIFI SIGNAL IS BEING RECEIVED.
  INTERFACE
   ENABLE ALLOW CLEAR DATA FROM SECURITY MENU.
   PRIOR TO MAKING A CALL YOU WILL NEED TO LET THE SWL1400 PICK UP AN IP ADDRESS FROM THE NETWORK. THIS MAY TAKE SEVERAL MINUTES.
   WHEN YOU HAVE A DIAL TONE, ON THE PC, USE THE DATA APPLICATION (E.G., WINDOWS DIAL-UP CONNECTION OR HYPERTERMINAL) TO DIAL INTO THE REMOTE SITE (USE A *99 AND 1 PRIOR TO THE NUMBER DIALED, E.G., *99, 1-202-555-1212).
ENCRYPTED
  CABLES
   CONNECT AC POWER AND POWER ON SWL1400
   CONNECT A DB-9 SERIAL CABLE TO THE "SECURE DATA IN FROM PC" PORT OF THE SWL1400 AND THE OTHER END TO THE SERIAL PORT OR USB PORT OF THE PC.
  SWITCH
   SET TO WIFI
  ANTENNA
   SET UP WIFI ANTENNA AND WATCH FOR LED SIGNAL THAT THE WIFI SIGNAL IS BEING RECEIVED
  INTERFACE
   ON THE PC, USE THE DATA APPLICATION (E.G., WINDOWS DIAL-UP CONNECTION OR HYPERTERMINAL) TO DIAL INTO THE REMOTE SITE. WHEN ENTERING THE TELEPHONE NUMBER OF THE DESTINATION POINT, FIRST TYPE IN *99 THEN ENTER THEN TELEPHONE NUMBER OF THE DESTINATION SITE (E.G., *99, 1202-555-1212).
   THE REMOTE MAY BE CONFIGURED WITH "AUTO ANSWER DATA" ENABLED (AUTO ANSWER RING MAY BE USED TO SPECIFY THE NUMBER OR RINGS BEFORE AUTO ANSWER DATA ANSWERS CALL) OR REMOTE END CAN USE THE DATA APPLICATION (AT COMMAND ATA) TO ANSWER.
   OR
   TOGGLE SECURE SELECT ON CONFIG MENU TO DATA OPTION. THEN, FOLLOW PROCE-

DURES FOR PLACING ENCRYPTED WIFI VOICE CALL TO ESTABLISH SECURE DATA CALL.

SAT Communications

Figure 15:
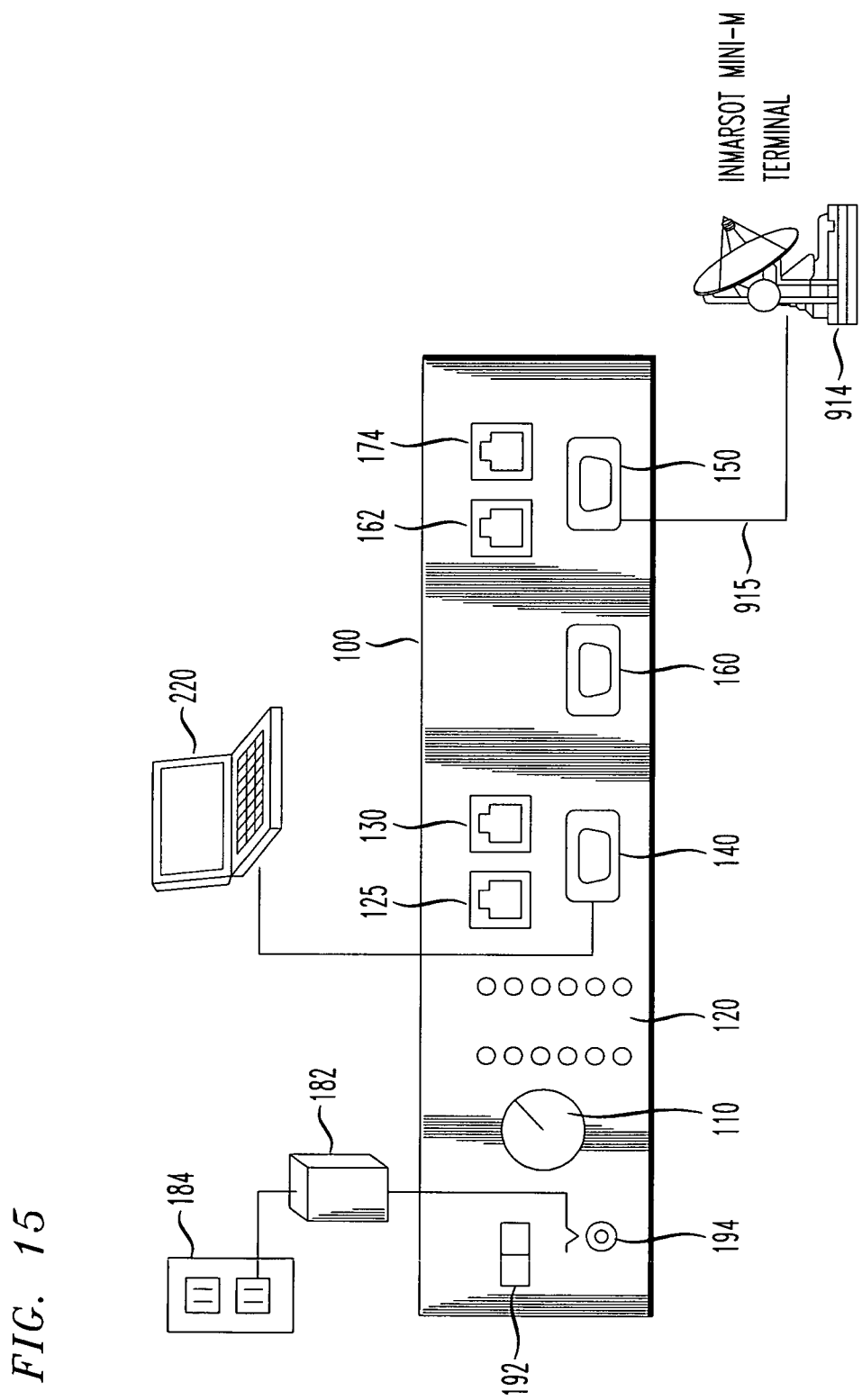
FIG. 15 shows the reach-back communications terminal set up to establish satellite voice communications over a satellite network, in accordance with the principles of the present invention.

FIG. 15 shows the reach-back communications terminal 100 set up to establish satellite voice communications over a satellite network, in accordance with the principles of the present invention.

A satellite communications link allows a secure connection for both voice and data. The reach-back communications terminal 100 can interface with any satellite interface that accepts AT command input, e.g., Iridium, Inmarsat Mini-M, Globalstar, etc. The reach-back communications terminal 100 eliminates the need to dial into a red switch for Iridium, as is necessary with the GD Iridium Secure Module (ISM). Although a satellite telephone 390 is shown in FIG. 3, any data transceiver, e.g., a cellular telephone, is connectable to the SATCOM port 150 that is compatible with the particular connection used, e.g., a serial connection.

In particular, as shown in FIG. 15, to make an unsecured SAT voice call, the reach-back communications terminal 100 does not provide any further capability beyond using the satellite handset 390.

To establish a secured satellite voice call using a satellite connection, the network selector switch 110 is set to the SAT position. Satellite transceiver 914 is connected to the SATCOM port 150 using an appropriate cable 915, e.g., a serial cable. A keypad on the satellite transceiver is used to dial a destination telephone number.

Once a connection is established with a destination telephone number, the integrated telephone handset 176 is used to conduct conversations over the satellite network. If the remote end of the call is configured for "Auto Secure on Answer", the reach-back communications terminal 100 will automatically establish a secure call with the remote end of the call.

To make an unsecured satellite data call, the network selector switch 110 is set to the SAT position. The satellite network is accessed by the personal computer 220 through the reach-back communications terminal 100 through the satellite telephone 390. Personal computer 220 is connected to the SDIPC 140 using a serial cable or USB cable 230. The personal computer 220 must be set to recognize an external modem within the reach-back communications terminal 100.

A menu option on the personality faceplate 145 is chosen to enable an unsecured data call. The satellite telephone keypad 520 is used to dial a destination telephone number. After dialing the destination telephone number on a satellite transceiver keypad, the personal computer 220 is initiated to make a data link call.

To make an encrypted satellite data call, the network selector switch 110 is set to the SAT position. The personal computer 220 is connected to the SDIPC 140. The personal computer 220 must be set to recognize an external modem within the reach-back communications terminal 100. A satellite transceiver keypad is used to dial a destination telephone number. After dialing the destination telephone number on the satellite transceiver keypad, a data application on the personal computer 220 is initiated to make a data link call.

If the remote end of the call is configured for "Auto Secure on Answer", the reach-back communications terminal 100 will automatically establish a secure satellite data call between the personal computer 220 and a remote computer.

Figure 16:
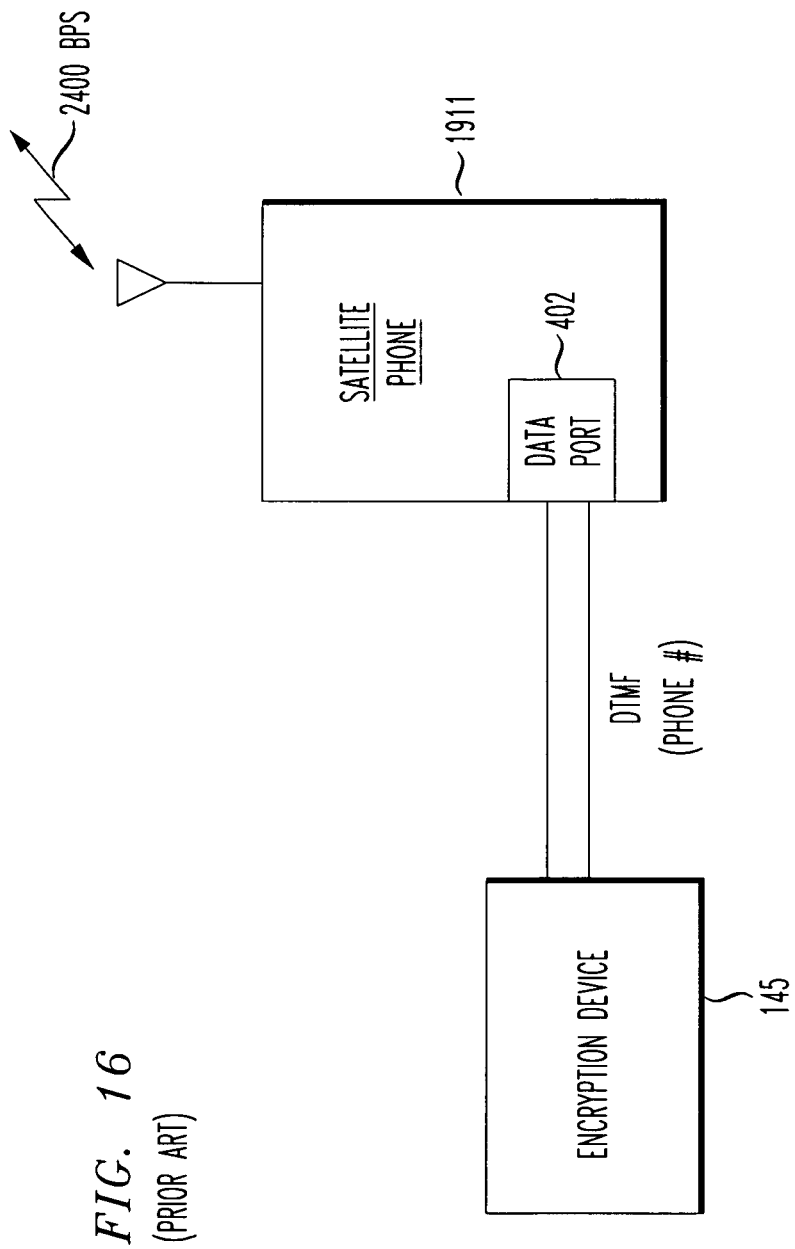
FIG. 16 shows a conventional configuration including a data interconnection between an encryption device and a data port of a satellite phone.

FIG. 16 shows a conventional configuration including a data interconnection between an encryption device and a data port of a satellite phone.

In particular, as shown in FIG. 16, a data connection is shown between an encryption device 145 and a data port 402 of a satellite phone 1911 as conventional devices and techniques would allow.

Exemplary satellite systems include IRIDIUM, GLOBAL STAR, INMARSAT (mini-m narrowband 9,600 baud network) and THURAYA (a middle eastern network). However, as realized by the present inventors, each of these satellite systems blindly expect modem type data to be input through its data port. Control of the satellite system, using AT commands (i.e., RS-232 type modem commands) happen outside the data line. For ordinary data being passed over the line, this is not a problem. However, with encrypted information, all information is contained within the modem data signal, with no accommodation for signaling outside of the modem data signal. Thus, with respect to encrypted data on the secure side of an encryption device, the satellite system does not receive control signals with respect to that data stream. Thus, commands such as dialing a telephone number cannot be accomplished with DTMF tones digitized and contained within the data stream. So, control signals such as start/stop bits will not work in a conventional configuration such as is shown in FIG. 16. Thus, the configuration of FIG. 16 will pass encrypted data over a satellite phone, but, if fully conforming to encryption standards, will not allow control functions to be passed from a secure side of the reach-back communications terminal to the non-secure side including the satellite system.

Moreover, the configuration of FIG. 16 will not allow conventional encrypted communications to transmit encrypted data through ordinary satellite channels because of the use of voice compression (e.g., CELP, RELP, etc.) and extremely slow data speeds (e.g., 2400 bits per second (b/s)) within the satellite system itself. Thus, conventional reach-back communication systems are not able to transmit secure data over a satellite system such as IRIDIUM, which use data compression techniques (e.g., CELP, RELP, etc.) at a relatively slow data rate (e.g., 2400 b/s). Typical satellite network data rates are too slow to accommodate a stream of encrypted data.

Figure 17:
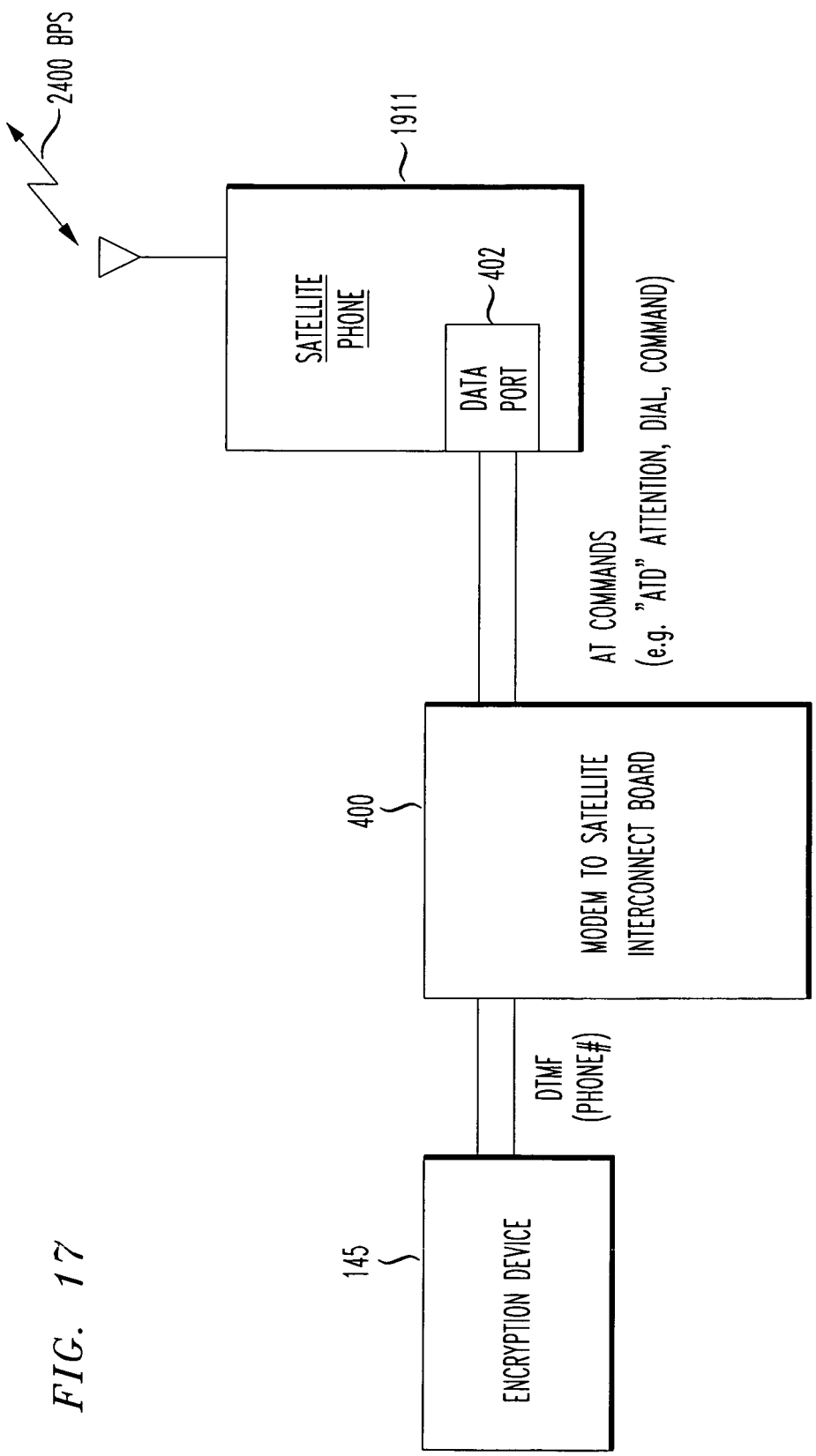
FIG. 17 shows use of a modem to satellite interconnect board to provide a data path between an encryption device and the data port of a satellite phone, including the ability to interpret control signals and control the satellite system appropriately, in accordance with an aspect of the present invention.

FIG. 17 shows use of a modem to satellite interconnect board to provide a data path between an encryption device and the data port of a satellite phone, including the ability to interpret control signals and control the satellite system appropriately, in accordance with an aspect of the present invention.

In particular, as shown in FIG. 17, a modem to satellite interconnect board 400 is interjected in the path between the conventional encryption device 145 and the conventional satellite phone 1911.

The modem to satellite interconnect board 400 transmits serial data or a digital fax from an analog device, in particular the encryption device 145, to a satellite phone 1911, thereby eliminating the extra steps and technology normally needed to make these devices "talk to" to each other. By sending information directly to a device, the modem to satellite interconnect board 400 simplifies design issues by providing an interface for new protocols and enabling compatibility between existing technologies. While disclosed with respect to interconnection between the encryption device 145 and a satellite device, the modem to satellite interconnect board 400 may alternatively be adapted to include protocols and interfaces to work with any circuit data enabled wireless phone, including CDMA, PCS, TDMA, GSM/GPRS and IDEN.

In accordance with this aspect of the invention, the modem to satellite interconnect board 400 monitors the data stream coming from the encryption device 145 to the modem to satellite interconnect board 400 for the presence of dual-tone, multi-frequency (DTMF) tones representing control signals, converts the DTMF tones to ASCII characters, which are in turn received as control signals by the satellite phone 1911, allowing control of the functions of the satellite system directly from the secure side of the encryption device 145.

An exemplary DTMF tone stream captured by the modem to satellite interconnect board 400 is the dialing of a telephone number from within the encrypted data path (i.e., in band signaling).

For example, the modem to satellite interconnect board 400 preferably provides a false dial tone to the encryption device 145. Breaking the dial tone, the user of the reach-back communications terminal 100 including the encryption device 145 may dial a phone number, e.g., "800 555 1212". The modem to satellite interconnect board 400 breaks presentation of the dial tone upon detection of DTMF tones, and decodes the entered phone number. The decoded phone number is then presented as straight ASCII serial data, preferably out-of-band to the satellite phone 1911 to the control lines of the data port 402, e.g., as "ATD8005551212" ("attention, dial command, 800-555-1212").

Thus, the modem to satellite interconnect board 400 performs the following functions:

(1) captures DTMF tones;
(2) demodulates V.34 encrypted modem information; and
(3) converts both the captured DTMF tones and demodulated V.34 encrypted modem information into an ASCII string for presentation to the data port 402 of a satellite phone.

In this way, the modem to satellite interface board 400 can be seen as including a cloaking feature. In particular, the conversion of V.34 modem data into an ASCII data stream can be seen as an encapsulation of the encrypted data, which cloaks the encrypted data such that it will appear to be benign data.

Figure 18:
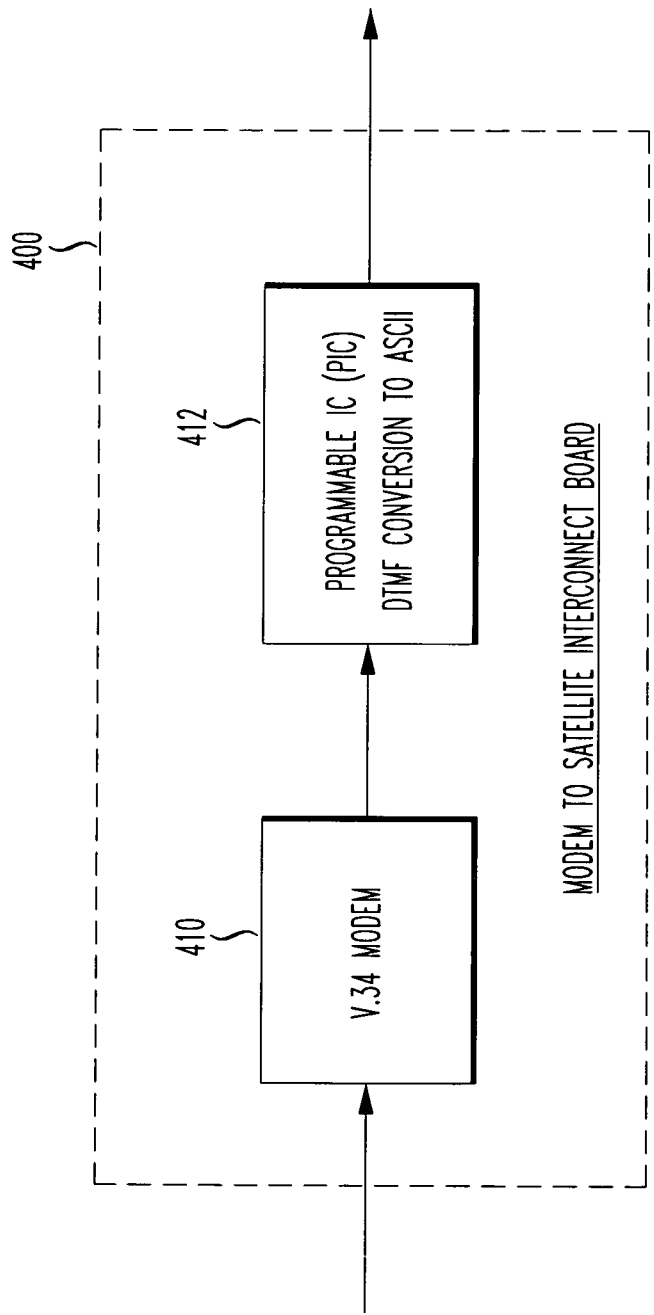
FIG. 18 is a block diagram of an exemplary modem to satellite interconnect board shown in FIG. 17 in more detail.

FIG. 18 is a block diagram of an exemplary modem to satellite interconnect board shown in FIG. 17 in more detail.

In particular, as shown in FIG. 18, the modem to satellite interconnect board 400 includes a V.34 modem 410 and a DTMF conversion to ASCII module.

While shown with a V.34 modem 410, the modem to satellite interconnect board 400 may alternatively, or additionally, include a modem following other protocols. However, such protocol should accommodate the data signal received from the encryption device 145.

The DTMF conversion to ASCII module 412 is preferably formed in a programmable integrated circuit (PIC), but may be implemented in software operating on a processor.

Figure 19:
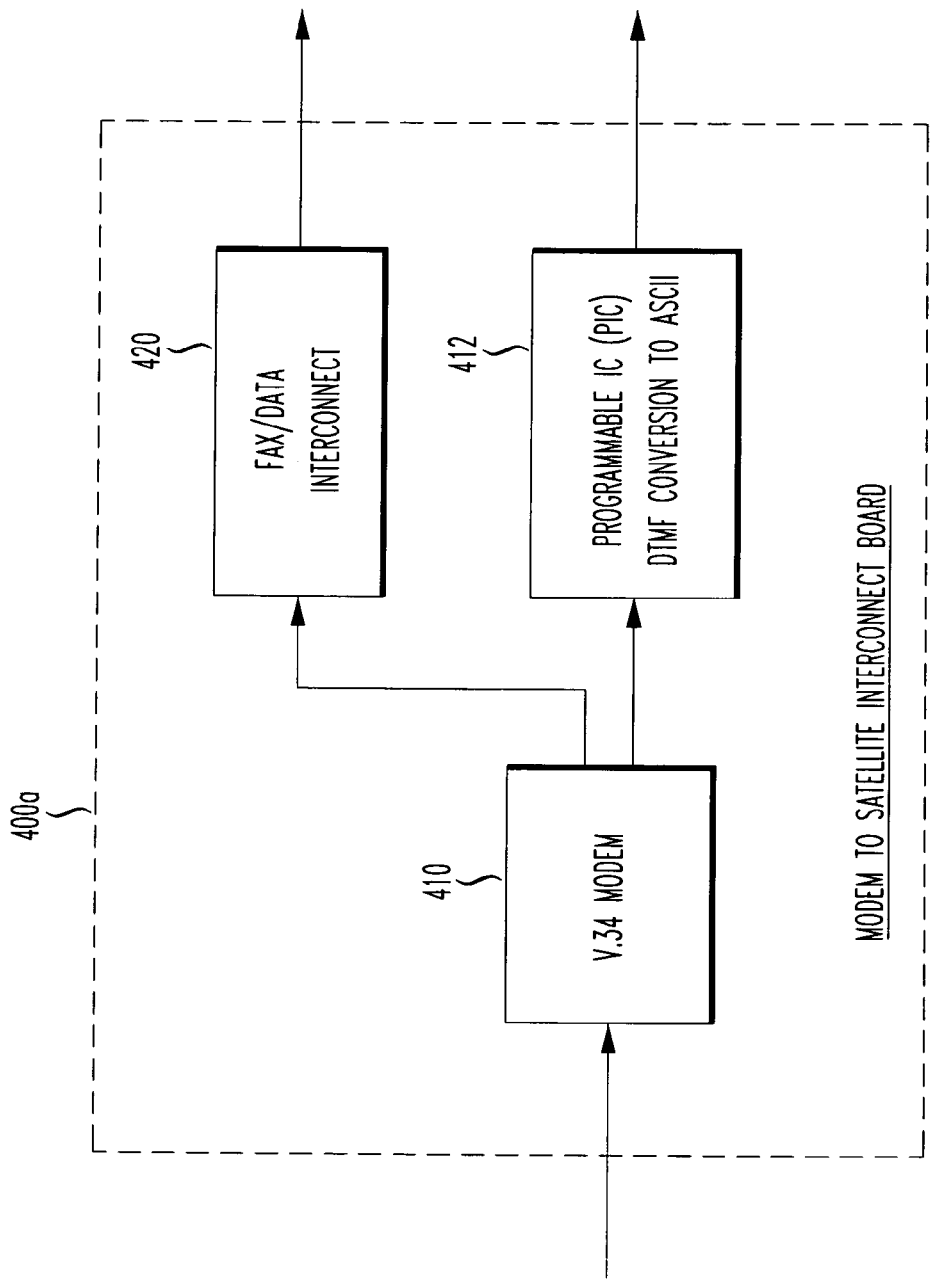
FIG. 19 is a block diagram of another exemplary modem to satellite interconnect board providing both an otherwise conventional Fax/data interconnect between an encryption device and a fax machine, as well as an interconnect between the encryption device and the data port of a satellite phone, in accordance with the principles of the present invention.

FIG. 19 is a block diagram of another exemplary modem to satellite interconnect board 400a providing both an otherwise conventional Fax/data interconnect between an encryption device and a fax machine, as well as an interconnect between the encryption device and the data port of a satellite phone, in accordance with the principles of the present invention.

In particular, as shown in FIG. 19, the modem to satellite interconnect board 400 of FIGS. 17 and 18 may include alternative output routes such as an otherwise conventional data path between the V.34 modem 410 to a Fax/data interface that translates fax data from the V.34 modem 410 to a fax machine, as is known (e.g., a TelEnable™ board commercially available from Molex Inc.)

FIG. 20 shows exemplary data rates for the different types of communication networks available with use on the disclosed reach-back communication terminal 100, in accordance with the principles of the present invention. The maximum data rate on any given communication network is dependent on the type of encryption used, as shown.

Figure 21:
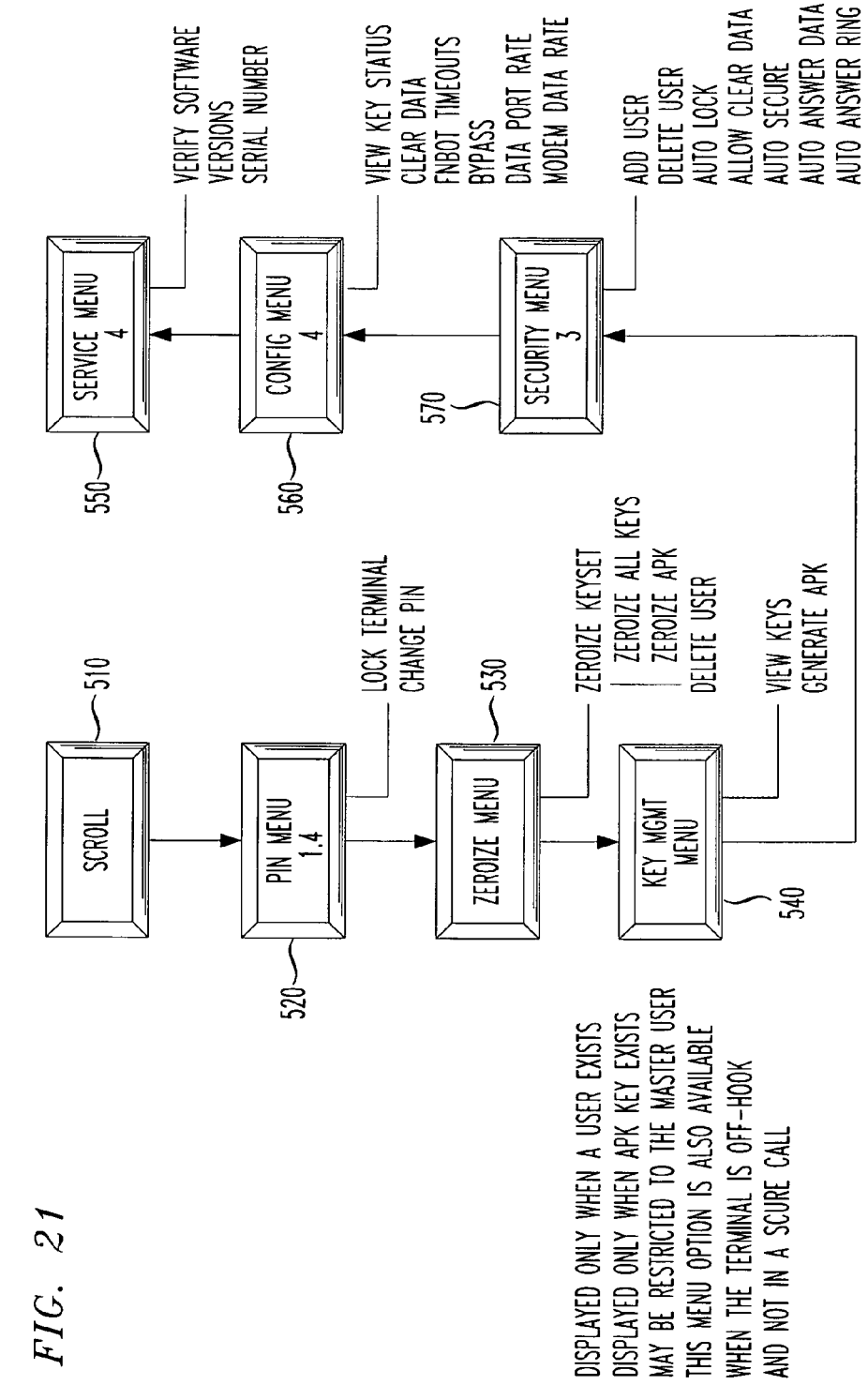
FIG. 21 shows keys available on the personality faceplate keypad, in accordance with the principles of the present invention.
Figure 22:
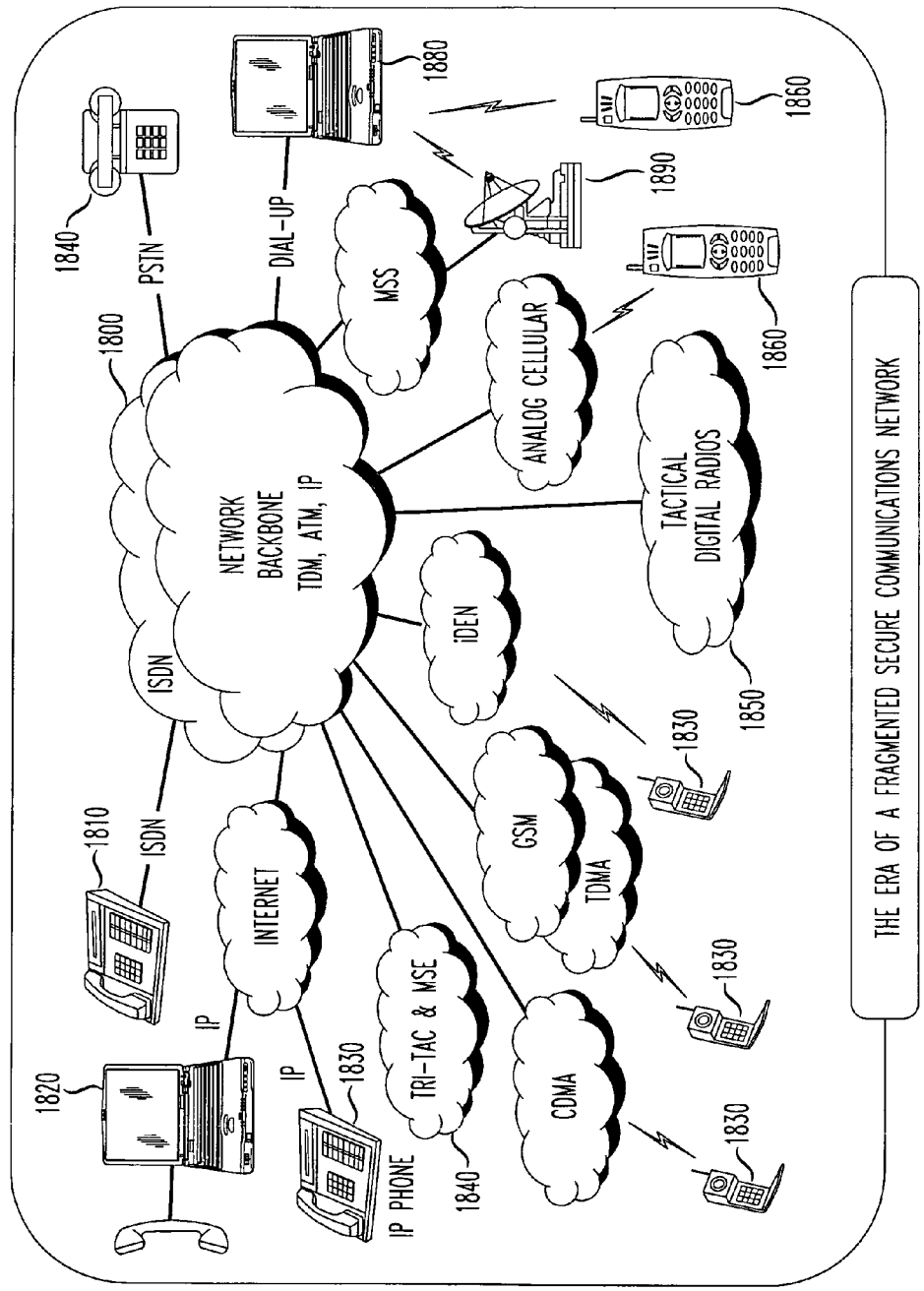
FIG. 22 shows a conventional fragmented secure communications network.
Figure 23:
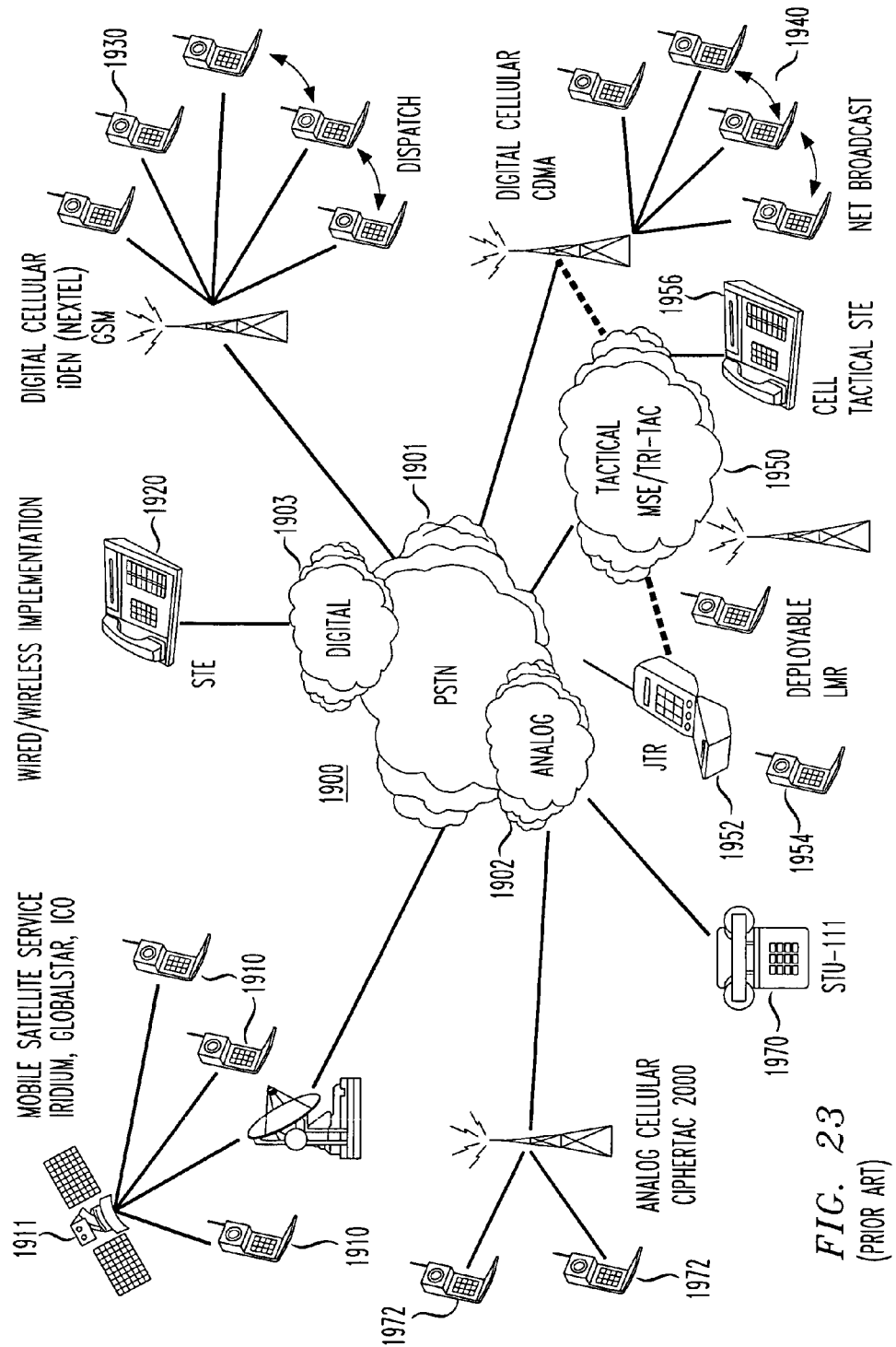
FIG. 23 shows a conventional combination wired and wireless communication network supporting secure communications.
Figure 24:
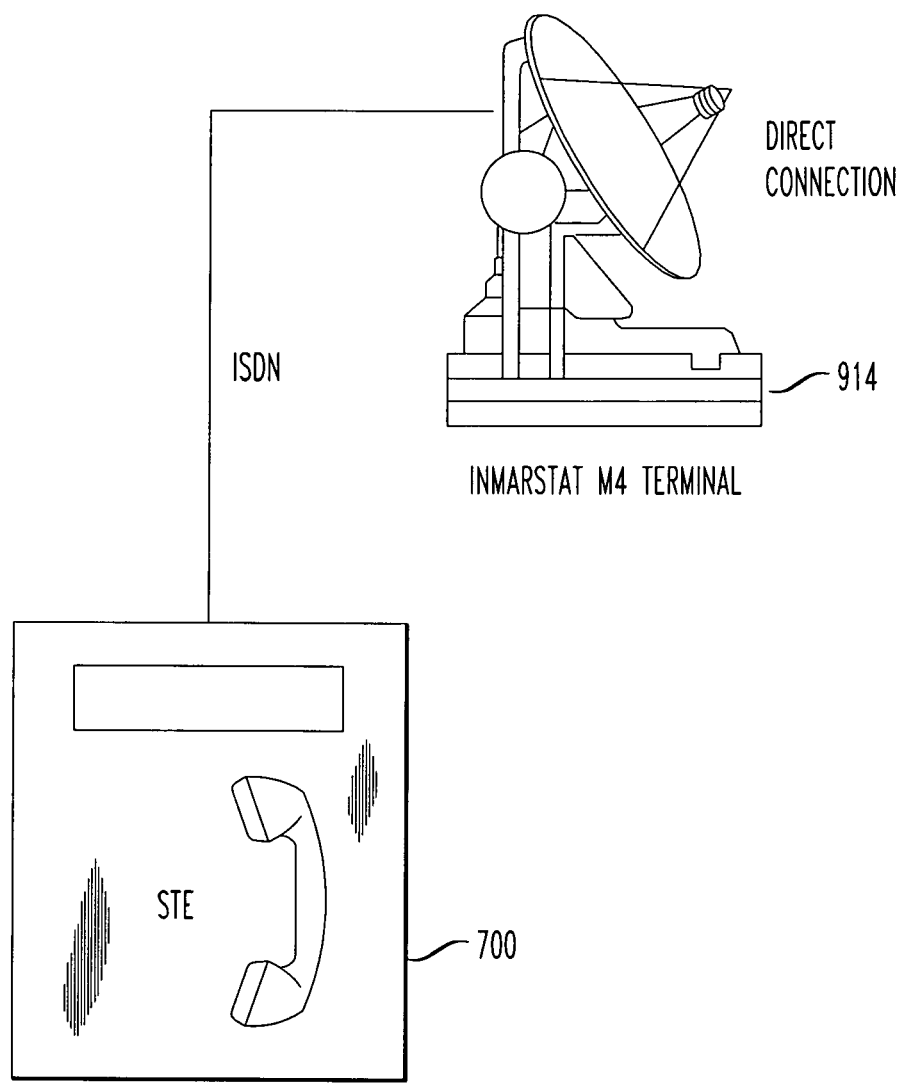
FIG. 24 shows a conventional deployable secure communication system utilizing a satellite communication network.
Figure 25:
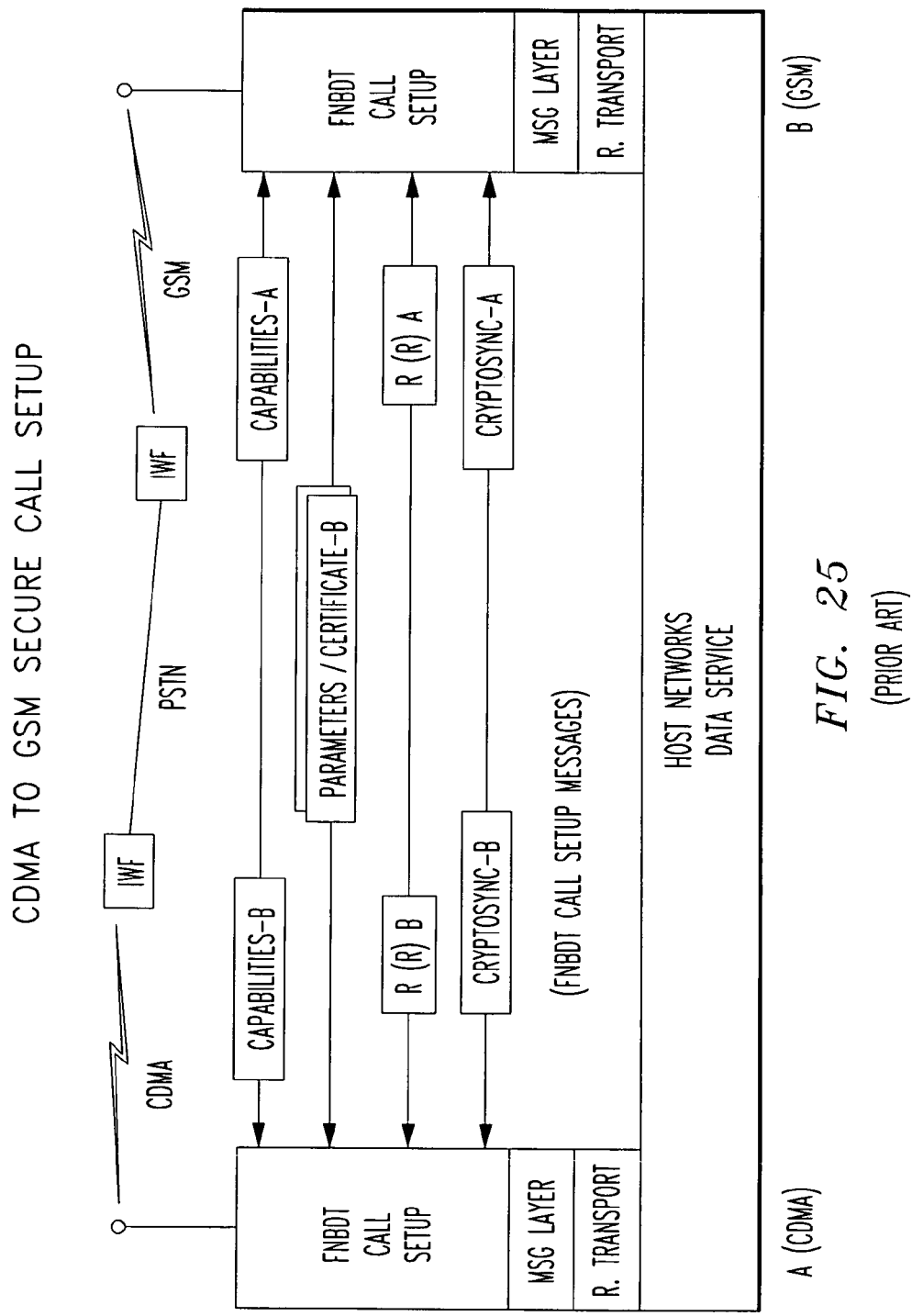
FIG. 25 shows a conventional CDMA to GSM secure call setup.
Figure 26:
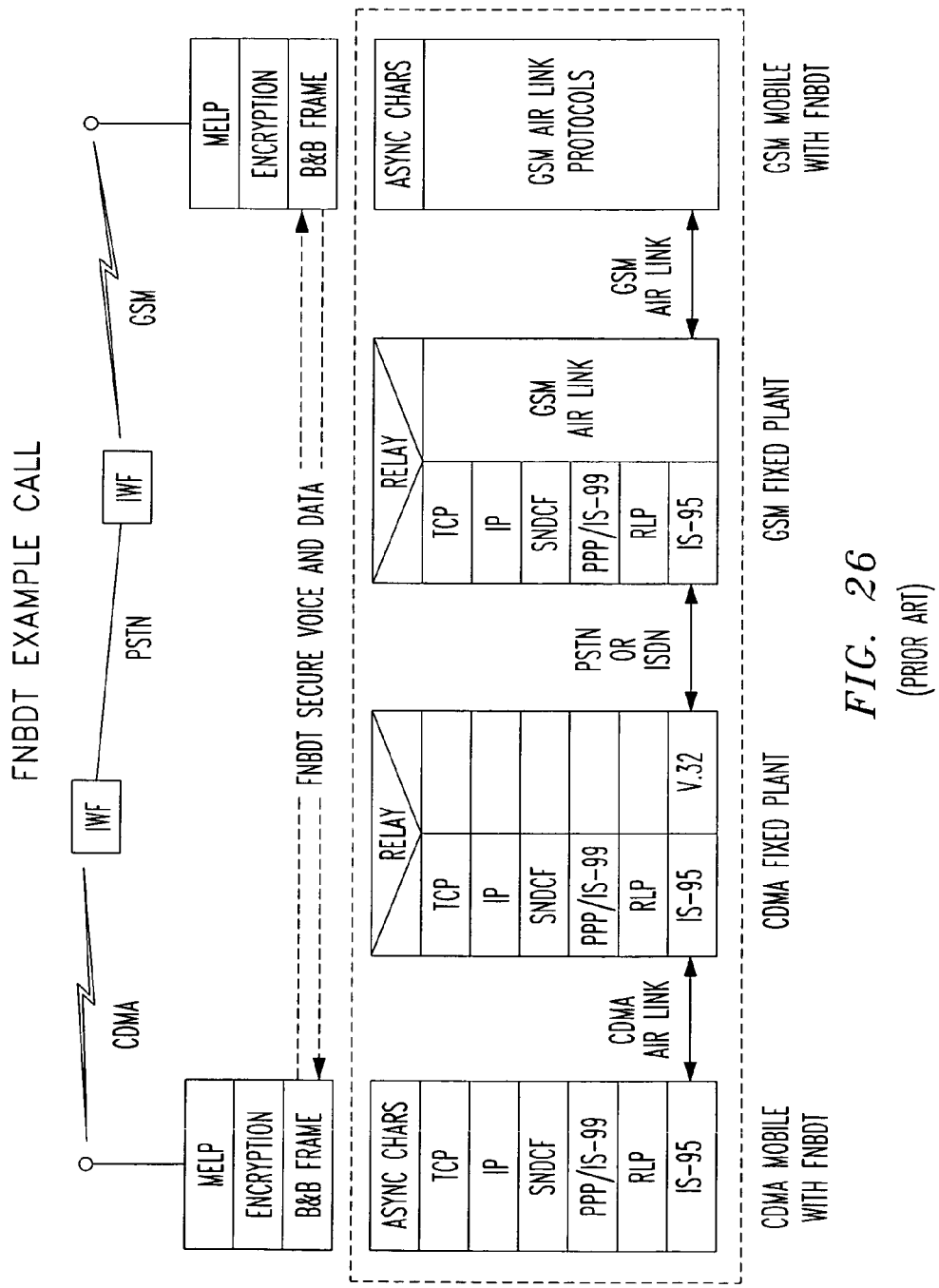
FIG. 26 shows a conventional FNBDT example call.

FIG. 21 shows exemplary display buttons available on the personality faceplate keypad 146, in accordance with the principles of the present invention.

In particular, as shown in FIG. 21, exemplary keys available to a user during use of the reach-back communications terminal 100 are, a Scroll key 510, a PIN Menu key 520, a Zeroize Menu key 530, a Key Mgmt Menu key 540, a Service Menu key 550, a Config Menu key 560 and a Security Menu key 570.

The Scroll key 510 allows a user to scroll through menu options viewable on the encryption device display 147.

The PIN Menu key 520 allows a user of the reach-back communications terminal 100 to lock the terminal until a proper PIN has been entered on the personality faceplate keypad 146. Moreover, the PIN Menu key 520 allows a user of the reach-back communications terminal to enter a menu to change the existing stored PIN. PIN menu is displayed only when an authorized user exists within the reach-back communications terminal 100, and the reach-back communications terminal 100 is Off-Hook and not in a secure call.

The Zeroize Menu key 530 allows a user of the reach-back communications terminal to zeroize a keyset, i.e., zeroize all keys and zeroize APK. Moreover, the Zeroize key 530 allows deletion of an authorized user of the reach-back communications terminal 100. Menus associated with the Zeroize Menu key 530 may be restricted to the Master User of the reach-back communications terminal 100.

The Key Mgmt Menu key 540 allows a user of the reach-back communications terminal to enter a menu to view keys and generate an APK.

The Security Menu key 570 allows a user of the reach-back communications terminal to enter menus for adding a user, deleting a user, automatically locking the reach-back communication terminal 100, clear data, automatically secure communications established with the reach-back communications terminal 100, automatically answer data communications and automatically answer a ring to the reach-back communications terminal 100. The options of deleting a user and automatically locking the reach-back communications terminal are only available to authorized users.

The Config Menu key 560 allows a user of the reach-back communications terminal 100 to view a key status, clear data, set FNBDT timeouts, set bypasses, set a data port rate and set a modem data rate.

The Service Menu key 550 allows a user of the reach-back communications terminal 100 to verify software versions and determine the serial number of the encryption device 145.

While the invention has been described with reference to the exemplary embodiments thereof, those skilled in the art will be able to make various modifications to the described embodiments of the invention without departing from the true spirit and scope of the invention.

What is claimed is:

1. A secure communications terminal, comprising:
a modem interface to accept an in-band encrypted dual tone multi-frequency (DTMF) signal directed to a controlled unsecure device, and to decrypt and demodulate said DTMF signal;
a DTMF to ASCII converter module to receive a data stream from said modem interface, to convert DTMF tone to ASCII by removing in-band control signaling from said data stream; and
a data port to present said ASCII control string out-of-band to said controlled unsecure device.

2. The secure communications terminal according to claim 1, wherein:

said unsecure device is a satellite phone; and
said ASCII control string is presented to a data port of said satellite phone.

3. The secure communications terminal according to claim 1, further comprising:
an encryption device to encrypt said encrypted DTMF signal presented to said modem interface.

4. The secure communications terminal according to claim 1, wherein:
said encrypted DTMF signal is V.34 encrypted information.

5. The secure communications terminal according to claim 1, further comprising:
an unsecure satellite phone interfaced to said data port.

6. The secure communications terminal according to claim 1, wherein:
said modem interface is formed in a programmable integrated circuit (PIC).

7. A method of providing unsecure communications over a secure data network, comprising:
directing an encrypted, in-band, dual-tone multi-frequency (DTMF) signal to a secure communications terminal;
decrypting and demodulating said in-band DTMF signal;
converting said DTMF signal into an ASCII control string; and
presenting said ASCII control string out-of-band to a controlled unsecured device.

8. The method of providing unsecure communications over a secure data network according to claim 7, further comprising:
presenting said ASCII control string to a data port of a satellite phone.

9. The method of providing unsecure communications over a secure data network according to claim 7, further comprising:
producing, via an encryption device, said encrypted DTMF signal.

10. The method of providing unsecure communications over a secure data network according to claim 7, wherein:
said encrypted DTMF signal is V.34 encrypted information.

11. The method of providing unsecure communications over a secure data network according to claim 7, wherein:
said controlled unsecure device is an unsecure satellite phone, said unsecure satellite phone being controlled from a secure side of an encryption device.

12. The method of providing unsecure communications over a secure data network according to claim 7, wherein:
said unsecure device is an unsecure satellite phone, a function of said unsecure satellite phone being controlled directly from a secure side of an encryption device.

* * * * *